United States Patent
Whitney et al.

(10) Patent No.: US 6,255,438 B1
(45) Date of Patent: Jul. 3, 2001

(54) PHENOLIC COMPOUNDS, POLYMERS DERIVED THEREFROM, AND METHOD

(75) Inventors: John Morgan Whitney, Niskayuna; Gary Charles Davis, Albany, both of NY (US); Anthony Carroll Snowden, San Pedro, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/620,667

(22) Filed: Jul. 20, 2000

(51) Int. Cl.[7] .......................... C08G 63/02; C08G 64/00
(52) U.S. Cl. ................................................. 528/196
(58) Field of Search ............................................. 528/196

(56) References Cited

U.S. PATENT DOCUMENTS

| | | |
|---|---|---|
| 3,030,331 | 4/1962 | Goldberg ........................... 528/176 |
| 3,169,121 | 2/1965 | Goldberg . |
| 3,207,814 | 9/1965 | Goldberg . |
| 4,238,596 | 12/1980 | Quinn . |
| 4,238,597 | 12/1980 | Markezich et al. . |
| 4,983,706 | 1/1991 | Fontana et al. . |
| 5,025,081 | 6/1991 | Fontana et al. . |
| 5,321,114 | 6/1994 | Fontana et al. . |
| 5,494,997 | 2/1996 | Fontana et al. . |
| 5,959,064 | 9/1999 | Krabbenhoft . |

FOREIGN PATENT DOCUMENTS 0 546 639    4/1997    (EP) .

*Primary Examiner*—Terressa M. Boykin
(74) *Attorney, Agent, or Firm*—S. Bruce Brown; Noreen C. Johnson

(57) ABSTRACT

Novel phenolic compounds are disclosed which bear at least two functional groups, at least one of which is a phenolic moiety. In one of its aspects the invention relates to phenolic compounds which may be derived from naturally occurring essential oils such as citronella oil. Polymers derived from novel phenolic compounds are also disclosed. In one embodiment polycarbonates and polyestercarbonates are made through copolymerization of novel phenolic compounds with at least one dihydric phenol and a carbonate precursor under reactive conditions.

92 Claims, No Drawings

PHENOLIC COMPOUNDS, POLYMERS DERIVED THEREFROM, AND METHOD

BACKGROUND OF THE INVENTION

The present invention relates to phenolic compounds and polymers derived therefrom. The invention also relates to methods for making phenolic compounds and polymers derived therefrom.

Phenolic compounds are used in the synthesis of a wide variety of chemical products, particularly in the production of plastics and other bulk specialty products. Phenolic compounds bearing at least two reactive functional groups, at least one of which is a phenolic moiety, are commonly used to prepare polymers, particularly condensation polymers. One example is the polymerization of bis(phenols) with phosgene to prepare polycarbonates. In some cases mixtures of monomers, each bearing at least two nucleophilic groups, are used in a polymerization process with a separate monomer bearing two electrophilic groups to tailor properties of the resulting polymer. An example is the preparation of a polyestercarbonate through reaction of phosgene with a mixture of a "hard-block" monomer such as bisphenol-A and a "soft-block" monomer such as an aliphatic alpha-omega dicarboxylic acid, for example dodecanedioic acid. Such polyestercarbonates (for example, LEXAN of General Electric Plastics) typically retain the high impact strength which is the hallmark of polycarbonate resin while offering superior melt and flow characteristics relative to the corresponding polycarbonate made without soft-block monomer.

Soft-block monomers such as aliphatic alpha-omega dicarboxylic acids are typically produced by conversion processes based upon the use of non-renewable petrochemical feedstock. These multi-step chemical conversion processes typically produce unwanted hazardous byproducts which result in yield losses and must be destroyed before they are released to the environment. Disposal of a hazardous waste stream greatly adds to the cost of production. In addition, the organic chemical synthesis of long-chain diacids is limited by the starting materials used, and each chemical synthesis process can produce only one species of diacid. Soft-block monomers such as aliphatic alpha-omega dicarboxylic acids may also be prepared by biological fermentation as described in U.S. Pat. No. 6,066,480. However, fermentation processes often have less than optimum productivity and space-volume rates for economic production.

New types of phenolic compounds which may serve, for example, as monomers in condensation polymerization processes are constantly being sought. In particular, new types of phenolic compounds are needed which bear at least two functional groups, at least one of which is a phenolic moiety, which can serve as soft-block monomers in condensation polymerization. Also, new methods for the production of phenolic compounds are needed which have economic advantage over more commonly known methods such as synthesis from smaller hydrocarbon fragments.

BRIEF SUMMARY OF THE INVENTION

The present invention is directed in one of its aspects to phenolic compounds which may be derived from naturally occurring essential oils such as citronella oil. Such oils are generally inexpensive and non-toxic, and have the advantage of being renewable resources. Thus, in one of its aspects the present invention is directed to phenolic compounds bearing at least two functional groups, at least one of which is a phenolic moiety. In this aspect the invention comprises phenolic compounds of the formula I:

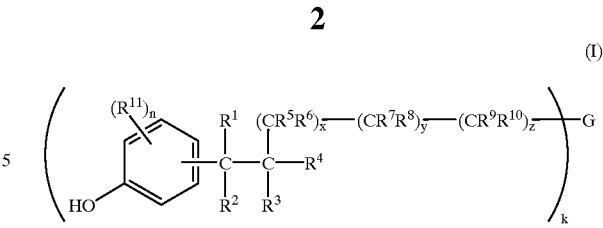
(I)

wherein $R^1$ and $R^2$ independently at each occurrence represent alkyl or aralkyl; the free valence bond linking the aryl ring to the alpha-carbon atom independently at each occurrence is either ortho or para to the phenolic group; $R^3$, $R^4$, $R^5$, $R^6$, $R^7$, $R^8$, $R^9$, and $R^{10}$ independently at each occurrence represent hydrogen, alkyl or aralkyl; $R^{11}$ independently at each occurrence represents alkyl or halogen; n independently at each occurrence is 0–3; x, y, and z independently at each occurrence are 0–4, wherein the sum of each x+y+z grouping is at least 1;

and either k is one and G represents $CH_2OH$, $CHO$, $CO_2H$, $COCl$, $CO_2R^{12}$, $CO_2M$ or

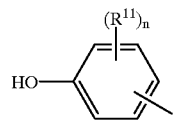
(II)

wherein $R^{12}$ is alkyl, aralkyl, alkaryl, or aryl; M is a cation; $R^{11}$ and n are as previously defined. and the free valence bond in formula II is either ortho or para to the phenolic group;

or k is two and G represents a linking moiety, wherein the linking moiety is either a carbonate linkage as in formula III:

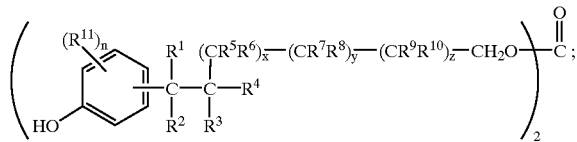
(III)

a mono-ether linkage $CH_2]_2O$ as in formula IV:

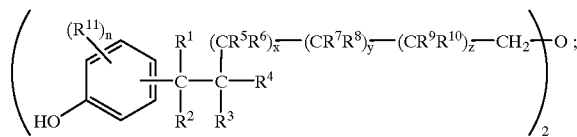
(IV)

a di-ether linkage $CH_2O]_2R^{13}$ as in formula V:

(V)

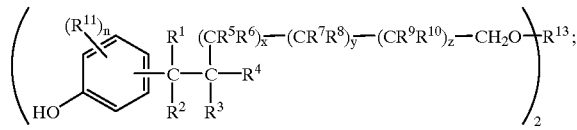

a mono-ester linkage (C=O)OCH$_2$ as in formula VI:

(VI)

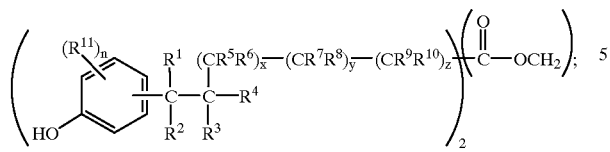

a di-ester linkage (C=O)O]$_2$R$^{14}$ as in formula VII:

(VII)

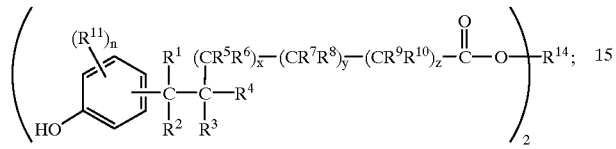

or a di-ester linkage CH$_2$O(C=O)]$_2$R$^{15}$ as in formula VIII:

(VIII)

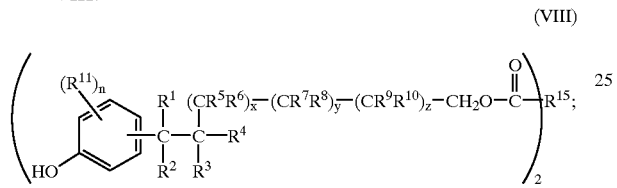

wherein R$^{13}$, R$^{14}$, and R$^{15}$ are alkyl, aralkyl, alkaryl, or aryl.

In another embodiment the present invention comprises a method for making phenolic compounds which comprises combining in the presence of an acidic material A) a precursor compound of the formula IX:

(IX)

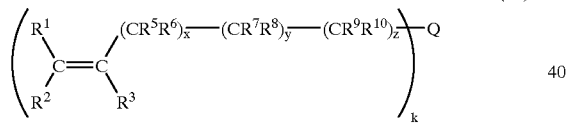

wherein R$^1$ and R$^2$ independently at each occurrence represent alkyl or aralkyl; R$^3$, R$^5$, R$^6$, R$^7$, R$^8$, R$^9$, and R$^{10}$ independently at each occurrence represent hydrogen, alkyl, or aralkyl; x, y, and z independently at each occurrence are 0–4, wherein the sum of each x+y+z grouping is at least 1;

and either k is one and Q is CH$_2$Br, CH$_2$Cl, CH$_2$OH, CHO, CO$_2$H, COCl, CO$_2$R$^{12}$, CO$_2$M, R$^{16}$C=CR$^{17}$R$^{18}$, or (II)

wherein the free valence bond linking the aryl ring to the alpha-carbon atom is either ortho or para to the phenolic group; R$^{11}$ independently at each occurrence represents alkyl or halogen; n is 0–3; R$^{12}$ is alkyl, aralkyl, alkaryl, or aryl; M is a cation; and R$^{16}$, R$^{17}$, and R$^{18}$ are each independently hydrogen, alkyl, or aralkyl;

or k is two and Q represents a linking moiety, wherein the linking moiety is either vii) a carbonate linkage CH$_2$O]$_2$(C=O) as in formula X:

(X)

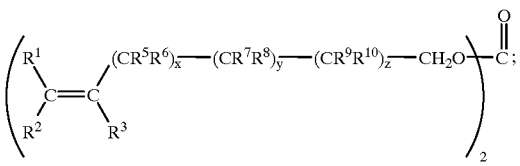

viii) a mono-ether linkage CH$_2$]$_2$O as in formula XI:

(XI)

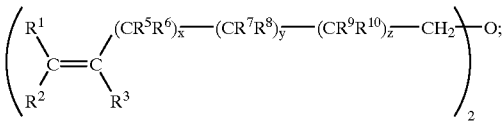

ix) a di-ether linkage CH$_2$O]$_2$R$^{13}$ as in formula XII:

(XII)

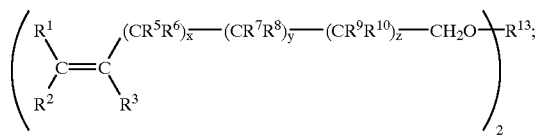

x) a mono-ester linkage (C=O)OCH$_2$ as in formula XIII:

(XIII)

xi) a di-ester linkage (C=O)O]$_2$R$^{14}$ as in formula XIV:

(XIV)

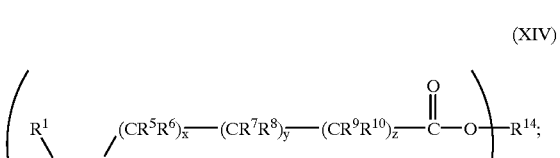

xii) a di-ester linkage CH$_2$O(C=O)]$_2$R$^{15}$ as in formula XV:

(XV)

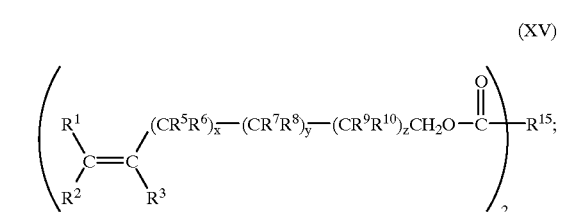

wherein R$^{13}$, R$^{14}$, and R$^{15}$ are alkyl, aralkyl, alkaryl, or aryl; and B) a phenolic reactant of formula XVI containing at least one unsubstituted ortho or para position

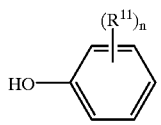

(XVI)

wherein $R^{11}$ independently at each occurrence represents alkyl or halogen; and n is 0–3.

In other embodiments the present invention comprises polymers made from the phenolic compounds of formula I and methods for making the polymers.

DETAILED DESCRIPTION OF THE INVENTION

The terms "radicals", "groups", and "moieties" are often used interchangeably hereinafter. Within the context of the present invention the term "alkyl" is intended to designate both normal alkyl, branched alkyl, and cycloalkyl radicals. Normal and branched alkyl radicals are preferably those comprising from 1 to about 22 carbon atoms, and include as illustrative non-limiting examples methyl, ethyl, propyl, isopropyl, butyl, tertiary-butyl, pentyl, neopentyl, hexyl, heptyl, octyl, isooctyl, and nonyl. Cycloalkyl radicals represented are preferably those comprising from 3 to about 12 ring carbon atoms. Some illustrative non-limiting examples of these cycloalkyl radicals include cyclobutyl, cyclopentyl, cyclohexyl, methylcyclohexyl, and cycloheptyl, and bicycloalkyl radicals such as [2.2.1]bicycloheptyl. Aralkyl radicals comprise aryl-substituted alkyl radicals comprising from 7 to about 22 carbon atoms; these include, but are not limited to, benzyl, phenylbutyl, phenylpropyl, and phenylethyl. Alkaryl radicals comprise alkyl-substituted aryl radicals comprising from 7 to about 24 carbon atoms; these include, but are not limited to, tolyl, xylyl, ethylphenyl, propylphenyl, and nonylphenyl. Aryl radicals comprise aromatic radicals with about 6–12 ring carbon atoms; these include, but are not limited to, phenyl, naphthyl, and biphenyl. Halogen radicals used in the various embodiments of the present invention are fluorine, chlorine and bromine, preferably chlorine or bromine, and more preferably bromine.

In one embodiment the present invention comprises phenolic compounds of the formula I:

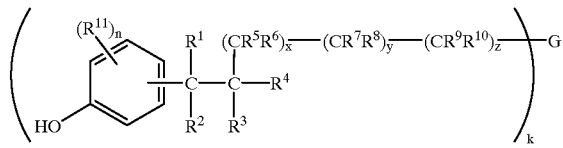

(I)

wherein each free valence bond linking an aryl ring to the alpha-carbon atom is independently either ortho or para to the phenolic group. In typical embodiments each free valence bond may be essentially exclusively either ortho or para, or each free valence bond may be a mixture of ortho and para positional isomers. When positional isomers relative to a phenolic group are possible in a phenolic compound of the formula I, it is to be understood that both ortho and para positional isomers and mixtures thereof are within the scope of the invention. In preferred embodiments, when k is one, the free valence bond may be essentially exclusively or at least predominantly para. Also in preferred embodiments, when k is two, each free valence bond may be essentially exclusively or at least predominantly para. In the present context the term "predominantly" means greater than 50 mole percent.

$R^1$ and $R^2$ independently at each occurrence represent alkyl or aralkyl. Preferably $R^1$ and $R^2$ are each independently at each occurrence a $C_{1-4}$ alkyl group; more preferably $R^1$ and $R^2$ are each independently at each occurrence a $C_{1-2}$ alkyl group; most preferably $R^1$ and $R^2$ are the same and are each a methyl group.

$R^3$, $R^4$, $R^5$, $R^6$, $R^7$, $R^8$, $R^9$, and $R^{10}$ independently at each occurrence represent hydrogen, alkyl, or aralkyl. Preferably $R^3$, $R^4$, $R^5$, $R^6$, $R^7$, $R^8$, $R^9$, and $R^{10}$ are independently at each occurrence hydrogen or a $C_{1-4}$ alkyl group; more preferably hydrogen or a $C_{1-2}$ alkyl group. Suitable values for x, y, and z are independently at each occurrence 0–4 inclusive, wherein the sum of each x+y+z grouping is at least 1. Preferably, x, y, and z are independently at each occurrence 0–2 inclusive and the sum of each x+y+z grouping is at least 2.

In one preferred embodiment at least one substituent in each of the moieties $CR^5R^6$, $CR^7R^8$, and $CR^9R^{10}$ is hydrogen, and x, y, and z are each greater than zero. In another preferred embodiment only two of the substituents $R^3$, $R^4$, $R^5$, $R^6$, $R^7$, $R^8$, $R^9$, and $R^{10}$ are independently a $C_{1-4}$ alkyl group, especially a methyl or ethyl group, and the remaining substituents of this category are hydrogen, and x, y, and z each have the value of one. In still another preferred embodiment only two of the substituents $R^3$, $R^4$, $R^5$, $R^6$, $R^7$, $R^8$, $R^9$, and $R^{10}$ are independently a $C_{1-4}$ alkyl group, especially a methyl or ethyl group, and the remaining substituents of this category are hydrogen, and at least one of x, y, and z has the value of zero, and the sum of x, y, and z is at least three. Thus, in a preferred embodiment x is zero, y is two, z is one, and $R^3$, $R^4$, $R^7$, and $R^8$ are each hydrogen, and $R^9$ and $R^{10}$ are each independently a $C_{1-2}$ alkyl group, and preferably $R^9$ and $R^{10}$ are a methyl and an ethyl group or two methyl groups. In yet another preferred embodiment only one of the substituents $R^3$, $R^4$, $R^5$, $R^6$, $R^7$, $R^8$, $R^9$, and $R^{10}$ is a $C_{1-4}$ alkyl group, especially a methyl or ethyl group, and the remaining substituents of this category are hydrogen. Thus, in a preferred embodiment x is two, y is one and z is one, and $R^3$, $R^4$, $R^5$, $R^6$, $R^7$, $R^9$, and $R^{10}$ are each hydrogen, and $R^8$ is a $C_{1-2}$ alkyl group, and preferably $R^8$ is a methyl or an ethyl group, most preferably a methyl group.

$R^{11}$ independently at each occurrence represents alkyl, preferably a $C_{1-22}$ alkyl group, or halogen, and suitable values for n are independently at each occurrence 0–3 inclusive. Preferably, n independently at each occurrence has the value of 0–2, more preferably 0–1, and most preferably 0. When the value of n is not zero, then $R^{11}$ is preferably methyl or bromine or a combination thereof, and said substituent (or substituents) is (are) most often present in one or more ortho positions relative to the phenolic group, although other positions are possible. Thus, in another preferred embodiment n independently at each occurrence has the value of one and $R^{11}$ is a methyl group ortho to the phenolic group. Thus, in still another preferred embodiment n independently at each occurrence has the value of one, $R^{11}$ is a pentadecyl group meta to the phenolic group, and the phenolic reactant of formula XVI is derived from hydrocardanol.

When k is one, G represents either CH$_2$OH, CHO, CO$_2$H, COCl, CO$_2$R$^{12}$, CO$_2$M, or

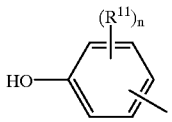
(II)

wherein R$^{12}$ is alkyl, aralkyl, alkaryl, or aryl, preferably aryl or alkaryl, and more preferably phenyl or ortho-methylphenyl; M is a cation; R$^{11}$ and n are as defined hereinabove, and the free valence bond in formula II may be essentially exclusively either ortho or para, or the free valence bond may be a mixture of ortho and para positional isomers. Preferably, R$^{11}$ is hydrogen and n is zero or R$^{11}$ is ortho-methyl and n is one. Preferably, M is an organic cation such as a quaternary ammonium cation, a guanidinium cation, or a quaternary phosphonium cation; or an inorganic cation such as an alkali or alkaline earth metal cation, particularly sodium.

When k is two, G represents a linking moiety, wherein the linking moiety is either
  i) a carbonate linkage CH$_2$O]$_2$(C=O) as in formula III;
  ii) a mono-ether linkage CH$_2$]$_2$O as in formula IV;
  iii) a di-ether linkage CH$_2$O]$_2$R$^{13}$ as in formula V;
  iv) a mono-ester linkage (C=O)OCH$_2$ as in formula VI;
  v) a di-ester linkage (C=O)O]$_2$R$^{14}$ as in formula VII; or
  vi) a di-ester linkage CH$_2$O(C=O)]$_2$R$^{15}$ as in formula VIII;
  wherein R$^{13}$, R$^{14}$, and R$^{15}$ are alkyl, aralkyl, alkaryl, or aryl. In preferred embodiments R$^{13}$, R$^{14}$, and R$^{15}$ each represent a C$_{1-10}$ alkylene or alkylidene group or phenylene wherein the two valence bonds in the linking phenylene are ortho, meta, or para, preferably meta or para to each other. In particularly preferred embodiments R$^{13}$ and R$^{14}$ are each an aryl residue derived from bisphenol-A, hydroquinone, resorcinol, or methylresorcinol; and R$^{15}$ is an aryl residue derived from terephthalic acid, isophthalic acid, or 2,6-naphthalenedicarboxylic acid.

When the compound of formula I comprises a linking moiety, the new compound is a bisphenol with terminal phenolic groups. The terminal phenolic groups may be the same or different in that they may have the same or different chemical formula. An example of terminal phenolic groups with different chemical formula is hydroxyphenyl (derived from phenol) and o-methylhydroxyphenyl (derived from o-cresol). Preferably, the terminal phenolic groups have the same chemical formula, as for example each may be hydroxyphenyl. When the terminal phenolic groups are the same and there is more than one positional isomer possible, then each group may represent the same positional isomer (as for example each may be 4-hydroxyphenyl or each may be 2-hydroxyphenyl or each may be 4-hydroxy-3-methyphenyl or each may be 2-hydroxy-4-pentadecylphenyl or each may be 3,5-dimethyl-4-hydroxyphenyl and so on) or a different positional isomer (as for example a combination of 4-hydroxyphenyl and 2-hydroxyphenyl, or a combination of 4-hydroxy-3-methyphenyl and 2-hydroxy-3-methylphenyl and so on). In particularly preferred embodiments each terminal phenolic group is 4-hydroxyphenyl.

In especially preferred embodiments phenolic compounds of the present invention are described by formula I in which
  (a) k is one, R$^1$ and R$^2$ are each a methyl group; R$^3$ and R$^4$ are hydrogen; R$^5$ and R$^6$ are hydrogen and x is two; R$^7$ is hydrogen, R$^8$ is methyl, and y is one; R$^9$ and R$^{10}$ are hydrogen and z is one; R$^{11}$ is hydrogen; and G is either CO$_2$H, COCl, CH$_2$OH, CHO, CO$_2$R$^{12}$, or CO$_2$M, wherein R$^{12}$ is alkyl, aralkyl, alkaryl, or aryl, preferably aryl or alkaryl, and more preferably phenyl or ortho-methylphenyl; and wherein M is a quaternary ammonium cation, a guanidinium cation, or sodium, and in each case the free valence bond linking the aryl ring to the alpha-carbon atom may be predominantly para to the phenolic group as in formula XVII:

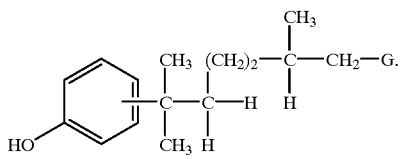
(XVII)

When G is CO$_2$H, then the phenolic compound is 3,7-dimethyl-7-hydroxyphenyl-octanoic acid, also referred to sometimes hereinafter as 7-hydroxyphenyl-citronellic acid.

(b) k is one, R$^1$ and R$^2$ are each a methyl group; R$^3$ and R$^4$ are hydrogen; R$^5$ and R$^6$ are hydrogen and x is two; R$^7$ is hydrogen, R$^8$ is methyl, and y is one; R$^9$ and R$^{10}$ are hydrogen and z is one; R$^{11}$ is pentadecyl meta to the phenolic group; and G is CO$_2$H as in formula XVIII (3,7-dimethyl-7-[pentadecyl-hydroxyphenyl]-octanoic acid) in which the free valence bond linking the aryl ring to the alpha-carbon atom may be predominantly ortho to the phenolic group and para to the pentadecyl group:

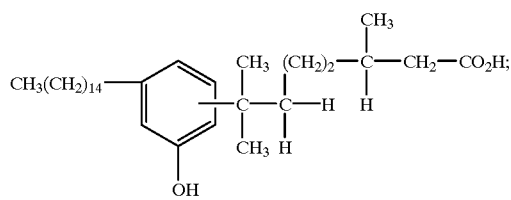
(XVIII)

(c) k is one, R$^1$ and R$^2$ are each a methyl group; R$^3$ and R$^4$ are hydrogen; R$^5$ and R$^6$ are hydrogen and x is two; R$^7$ is ethyl, R$^8$ is methyl, and y is one; z is zero; R$^{11}$ is methyl ortho to the phenolic group and n is one; and G is a phenolic group of formula II in which R$^{11}$ is methyl ortho to the phenolic group and n is one, as in formula XIX (2,6-bis[methylhydroxyphenyl]-2,6-dimethyloctane) in which the free valence bond linking the aryl ring to the alpha-carbon atom is predominantly para to the phenolic group for each aryl substituent:

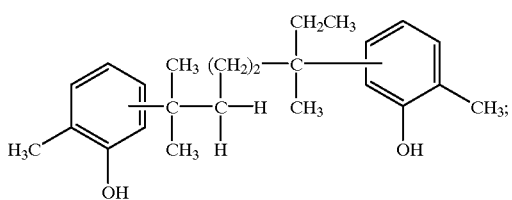
(XIX)

(d) k is two, and in each grouping R$^1$ and R$^2$ are each a methyl group; R$^3$ and R$^4$ are hydrogen; R$^5$ and R$^6$ are hydrogen and x is two; R$^7$ is hydrogen, R$^8$ is methyl, and y is one; R$^9$ and R$^{10}$ are hydrogen and z is one; R$^{11}$ is hydrogen; and G is a linking group, as in formula XX:

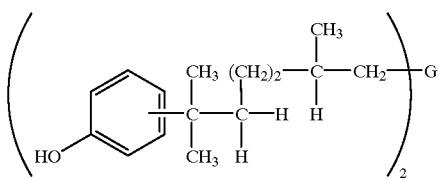

(XX)

wherein the linking moiety is either a carbonate linkage $[CH_2O]_2(C=O)$; a mono-ether linkage $[CH_2]_2O$; a di-ether linkage $[CH_2O]_2R^{13}$; a mono-ester linkage $(C=O)OCH_2$; a di-ester linkage $(C=O)O]_2R^{14}$; or a di-ester linkage $CH_2O(C=O)]_2R^{15}$ wherein $R^{13}$, $R^{14}$, and $R^{15}$ are alkyl, aralkyl, alkaryl, or aryl. In preferred embodiments $R^{13}$, $R^{14}$, and $R^{15}$ each represent a $C_{1-10}$ alkylene or alkylidene group or phenylene wherein the two valence bonds in the linking phenylene are ortho, meta, or para, preferably meta or para to each other. In more preferred embodiments $R^{13}$ and $R^{14}$ are each an aryl residue derived from bisphenol-A, hydroquinone, resorcinol, or methylresorcinol; and $R^{15}$ is an aryl residue derived from terephthalic acid, isophthalic acid, or 2,6-naphthalenedicarboxylic acid. In an especially preferred embodiment G is a di-ester linkage $CH_2O(C=O)]_2R^{15}$ wherein $R^{15}$ is a phenylene group, preferably either meta-phenylene or para-phenylene (that is, an aryl residue derived from isophthalic acid or from terephthalic acid, respectively), as in formula XXI in which the free valence bond linking each of the two phenolic rings to each of the two alpha-carbon atoms may be predominantly para to the phenolic group:

(XXI)

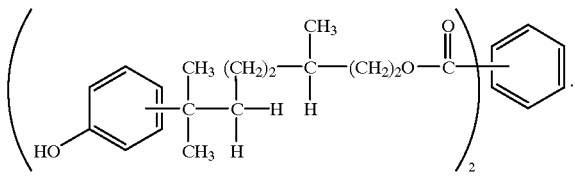

In another especially preferred embodiment G is a mono-ester linkage $O(C=O)CH_2$, as in formula XXII in which the free valence bond linking each of the two phenolic rings to each of the two alpha-carbon atoms may be predominantly para to the phenolic group:

pound of the formula IX with a phenolic reactant of formula XVI containing at least one unsubstituted ortho or para position. Precursor compounds of formula IX comprise:

(IX)

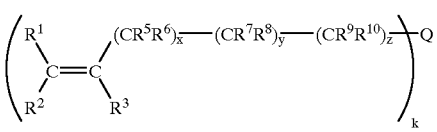

wherein $R^1$ and $R^2$ independently at each occurrence represent alkyl or aralkyl. Preferably $R^1$ and $R^2$ independently at each occurrence are a $C_{1-4}$ alkyl group; more preferably $R^1$ and $R^2$ independently at each occurrence are a $C_{1-2}$ alkyl group; most preferably $R^1$ and $R^2$ are the same and are each a methyl group.

$R^3$, $R^5$, $R^6$, $R^7$, $R^8$, $R^9$, and $R^{10}$ in formula IX independently at each occurrence represent hydrogen, alkyl, or aralkyl. Preferably $R^3$, $R^5$, $R^6$, $R^7$, $R^8$, $R^9$, and $R^{10}$ independently at each occurrence are hydrogen or a $C_{1-4}$ alkyl group; more preferably $R^3$, $R^5$, $R^6$, $R^7$, $R^8$, $R^9$, and $R^{10}$ independently at each occurrence are hydrogen or a $C_{1-2}$ alkyl group. Suitable values for x, y, and z are independently at each occurrence 0–4 inclusive, wherein the sum of each x+y+z grouping is at least 1. Preferably, x, y, and z are independently at each occurrence 0–2 inclusive and the sum of each x+y+z grouping is at least 2.

In one preferred embodiment at least one substituent in each of the moieties $CR^5R^6$, $CR^7R^8$, and $CR^9R^{10}$ in formula IX is hydrogen, and x, y, and z are each greater than zero. In another preferred embodiment only two of the substituents $R^3$, $R^5$, $R^6$, $R^7$, $R^8$, $R^9$, and $R^{10}$ are independently a $C_{1-4}$ alkyl group, especially a methyl or ethyl group, and the remaining substituents of this category are hydrogen, and x, y, and z each have the value of one. In still another preferred embodiment only two of the substituents $R^3$, $R^5$, $R^6$, $R^7$, $R^8$, $R^9$, and $R^{10}$ are independently a $C_{1-4}$ alkyl group, especially a methyl or ethyl group, and the remaining substituents of this category are hydrogen, and at least one of x, y, and z has the value of zero, and the sum of x, y, and z is at least three. Thus, in a preferred embodiment x is zero, y is two, z is one, and $R^3$, $R^7$, and $R^8$ are each hydrogen, and $R^9$ and $R^{10}$ are each independently a $C_{1-2}$ alkyl group, and preferably $R^9$ and $R^{10}$ are a methyl and an ethyl group or two methyl groups. In yet another preferred embodiment only one of the substituents $R^3$, $R^5$, $R^6$, $R^7$, $R^8$, $R^9$, and $R^{10}$ is a $C_{1-4}$ alkyl group, especially a methyl or ethyl group, and the remaining (XXII)

When optical isomerism is possible in a phenolic compound of formula I, it is to be understood that all optical isomers and mixtures of optical isomers are within the scope of the invention although no particular isomer may have been depicted.

In another embodiment the present invention is a method for making phenolic compounds which comprises combining in the presence of an acidic material a precursor comsubstituents of this category are hydrogen. Thus, in a preferred embodiment x is two, y is one and z is one, and $R^3$, $R^5$, $R^7$, $R^9$, and $R^{10}$ are each hydrogen, and $R^8$ is a $C_{1-2}$ alkyl group, and preferably $R^8$ is a methyl or an ethyl group, most preferably a methyl group.

When k is one, Q in formula IX represents either $CH_2Br$, $CH_2Cl$, $CH_2OH$, $CHO$, $CO_2H$, $COCl$, $CO_2R^{12}$ or $CO_2M$, wherein $R^{12}$ is alkyl, aralkyl, alkaryl, or aryl, preferably aryl or alkaryl, and more preferably phenyl or ortho-methylphenyl; and wherein M is an organic cation such as a quaternary ammonium cation, a guanidinium cation, or a quaternary phosphonium cation; or an inorganic cation such as an alkali or alkaline earth metal cation, particularly sodium. Alternatively, when k is one, Q represents a moiety of the formula II:

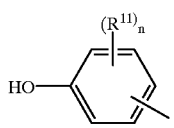

(II)

wherein the free valence bond in formula II may be essentially exclusively either ortho or para, or the free valence bond may be a mixture of ortho and para positional isomers. When positional isomers relative to a phenolic group are possible in a precursor compound of the formula IX, it is to be understood that both ortho and para positional isomers and mixtures thereof are within the scope of the invention.

$R^{11}$ independently at each occurrence in formula II represents alkyl or halogen, and n independently at each occurrence has values of 0–3 inclusive. Preferably, n independently at each occurrence has the value of 0–2, more preferably 0–1, and most preferably 0. When the value of n is not zero, then $R^{11}$ is preferably methyl or bromine or a combination thereof, and said substituent (or substituents) is (are) most often present in one or more ortho positions relative to the phenolic group. Preferably, $R^{11}$ is hydrogen or methyl. Thus, in a preferred embodiment n has the value of one and $R^{11}$ is a methyl group ortho to the phenolic group. In still another preferred embodiment n has the value of one, $R^{11}$ is a pentadecyl group meta to the phenolic group, and the phenolic compound of formula II is derived from hydrocardanol.

Alternatively, when k is one, Q represents $R^{16}C=CR^{17}R^{18}$, wherein $R^{16}$, $R^{17}$, and $R^{18}$ are each independently hydrogen, alkyl, or aralkyl; preferably $R^{16}$, $R^{17}$, and $R^{18}$ are each independently hydrogen or $C_{1-4}$ alkyl; more preferably $R^{16}$, $R^{17}$, and $R^{18}$ are each independently hydrogen or $C_{1-2}$ alkyl;

When k is two, Q represents a linking moiety, wherein the linking moiety is either
vii) a carbonate linkage $CH_2O]_2(C=O)$ as in formula X;
viii) a mono-ether linkage $CH_2]_2O$ as in formula XI;
ix) a di-ether linkage $CH_2O]_2R^{13}$ as in formula XII:
x) a mono-ester linkage $(C=O)OCH_2$ as in formula XIII;
xi) a di-ester linkage $(C=O)O]_2R^{14}$ as in formula XIV; or
xii) a di-ester linkage $CH_2O(C=O)]_2R^{15}$ as in formula XV;
wherein $R^{13}$, $R^{14}$, and $R^{15}$ are alkyl, aralkyl, alkaryl, or aryl. In preferred embodiments $R^{13}$, $R^{14}$, and $R^{15}$ each represent a $C_{1-10}$ alkylene or alkylidene group or phenylene wherein the two valence bonds in the linking phenylene are ortho, meta, or para, preferably meta or para to each other. In particularly preferred embodiments $R^{13}$ and $R^{14}$ are each an aryl residue derived from hydroquinone, resorcinol, or methylresorcinol; and $R^{15}$ is an aryl residue derived from terephthalic acid, isophthalic acid, or 2,6-naphthalenedicarboxylic acid.

In especially preferred embodiments precursors for phenolic compounds of the present invention are described by formula IX in which (a) k is one, and $R^1$ and $R^2$ are each a methyl group; $R^3$ is hydrogen; $R^5$ and $R^6$ are hydrogen and x is two; $R^7$ is hydrogen, $R^8$ is methyl, and y is one; $R^9$ and $R^{10}$ are hydrogen and z is one; and Q is either $CH_2Br$, $CH_2Cl$, $CO_2H$, $COCl$, $CH_2OH$, $CHO$, $CO_2R^{12}$, or $CO_2M$, wherein $R^{12}$ is alkyl, aralkyl, alkaryl, or aryl, preferably aryl or alkaryl, and more preferably phenyl or ortho-methylphenyl; and wherein M is a quaternary ammonium cation, a guanidinium cation, or sodium, as in formula XXII:

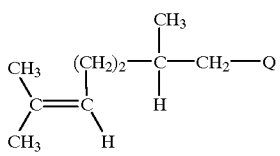

(XXIII)

(b) k is two, and in each grouping $R^1$ and $R^2$ are each a methyl group; $R^3$ is hydrogen; $R^5$ and $R^6$ are hydrogen and x is two; $R^7$ is hydrogen, $R^8$ is methyl, and y is one; $R^9$ and $R^{10}$ are hydrogen and z is one; and Q is a linking group, as in formula XXIV:

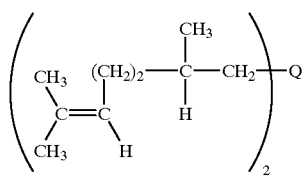

(XXIV)

wherein the linking moiety is either a carbonate linkage $CH_2O]_2(C=O)$; a mono-ether linkage $CH_2]_2O$; a di-ether linkage $CH_2O]_2R^{13}$; a mono-ester linkage $(C=O)OCH_2$; a di-ester linkage $(C=O)O]_2R^{14}$; or a di-ester linkage $CH_2O(C=O)]_2R^{15}$ wherein $R^{13}$, $R^{14}$, and $R^{15}$ are alkyl, aralkyl, alkaryl, or aryl. In preferred embodiments $R^{13}$, $R^{14}$, and $R^{15}$ each represent a $C_{1-10}$ alkylene or alkylidene group or phenylene wherein the two valence bonds in the linking phenylene are ortho, meta, or para, preferably meta or para to each other. In particularly preferred embodiments $R^{13}$ and $R^{14}$ are each an aryl residue derived from bisphenol-A, hydroquinone, resorcinol, or methylresorcinol; and $R^{15}$ is an aryl residue derived from terephthalic acid, isophthalic acid, or 2,6-naphthalenedicarboxylic acid.

(c) k is one, and $R^1$ and $R^2$ are each a methyl group; $R^3$ is hydrogen; $R^5$ and $R^6$ are hydrogen and x is two; $R^7$ is hydrogen, $R^8$ is methyl, and y is one; z is zero; and Q is $R^{16}C=CR^{17}R^{18}$, wherein $R^{16}$, $R^{17}$, $R^{18}$ are hydrogen, as in formula XXV:

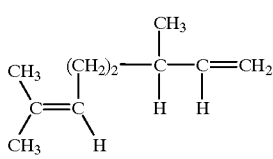

(XXV)

(d) k is one, and $R^1$ and R are each a methyl group; $R^3$ is hydrogen; $R^5$ and $R^6$ are hydrogen and x is two; y and z are zero; and G is $R^{16}C=CR^{17}R^{18}$, wherein $R^{16}$ is methyl, $R^{17}$ is hydrogen, and $R^{18}$ is methyl, as in formula XXVI:

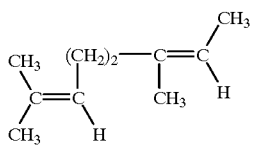

(XXVI)

(e) k is one, and $R^1$ and $R^2$ are each a methyl group; $R^3$ is hydrogen; $R^5$ and $R^6$ are hydrogen and x is one; y and z are zero; and G is $R^{16}C=CR^{17}R^{18}$, wherein $R^{16}$ is hydrogen, $R^{17}$ is methyl, and $R^{18}$ is ethyl, as in formula XXVII:

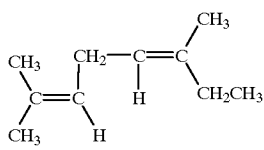

(XXVII)

When unsaturation occurs in precursor compounds of formula IX, it is to be understood that both cis and trans isomers are within the scope of the invention although only one such isomer may have been depicted. When optical isomerism is possible in a precursor molecule of formula IX, it is to be understood that all optical isomers and mixtures of optical isomers are within the scope of the invention although no particular isomer may have been depicted.

Preferred precursor compounds of formula IX are dienes such as 2,5-dimethyl-1,5-hexadiene, 3,3-dimethyl-1,5-hexadiene, 3,4-dimethyl-1,5-hexadiene, 2,6-dimethyl-1,5-heptadiene, 2,6-dimethyl-2,5-heptadiene, 3,7-dimethyl-1,6-octadiene, 5,7-dimethyl-1,6-octadiene, 2,6-dimethyl-2,6-octadiene (also known as dihydromyrcene), 2,6-dimethyl-2,5-octadiene, 3,6-dimethyl-2,5-octadiene, 2,7-dimethyl-2,6-octadiene, 2,6-dimethyl-2,7-octadiene.

It is also within the scope of the invention to employ as precursor compounds any compound which may be converted under the reaction conditions to a compound of formula IX. For example, it is within the scope of the invention to employ a diol or mono-alcohol that may dehydrate under the reaction conditions to provide a compound of formula IX. Illustrative examples of such alcohols include diols or mono-alcohols obtained by hydrating any of the compounds of formulas XXIII, XXIV, XXV, XXVI, and XXVII,. Such precursors to compounds of formula IX may be employed as essentially pure compounds or as mixtures including mixtures with compounds of formula IX (for example, mixture of appropriate diols or mono-alcohols with compounds of formula IX).

In addition it is within the scope of the invention to employ as precursor compounds any compound which may isomerize under the reaction conditions to provide a compound of formula IX. For example, it is within the scope of the invention to employ a diene with two terminal $CH_2$ groups, as illustrated by 2,7-dimethyl-1,7-octadiene, which may isomerize to a precursor of formula IX. Those skilled in the art will also recognize that mixtures of precursors of formula IX may result through isomerization, particularly olefin isomerization, under the reaction conditions even though essentially a single precursor compound of formula IX may have been added to the reaction mixture. Accordingly, the invention also encompasses the use of mixtures of precursor compounds of formula IX, whether the mixture results from use of at least two compounds of formula IX or from at least partial isomerization under the reaction conditions of what was initially essentially a single compound of formula IX. Accordingly, the invention also encompasses mixtures of phenolic compounds of formula I, whether the mixture results from use of at least two precursor compounds of formula IX or from at least partial isomerization under the reaction conditions of what was initially essentially a single precursor compound of formula IX.

Precursors for phenolic compounds which are described by formula IX may be derived from any convenient source. One advantage of key embodiments of the present invention is the use of naturally occurring essential oils as precursors for the phenolic compounds. In particular linear diterpenes such as those derived from citronella oil may be employed as precursor compounds for the phenolic compounds of formula I. Raw material sources for citronella oil or its components include the Cymbopogan grasses from Java or Ceylon, eucalyptus, and turpentine extracts and distillates. Citronella oil is typically a mixture of citronellal (3,7-dimethyl-6-octanal), citronellol (3,7-dimethyl-6-octen-1-ol) and geraniol (3,7-dimethyl-2,6-octadien-1-ol). Geraniol may be reduced and oxidized by methods well-known in the art to yield a precursor compound of formula IX. Citronellal and citronellol may be oxidized to the corresponding carboxylic acid by methods well-known in the art. In preferred embodiments citronellic acid (3,7-dimethyl-6-octenoic acid) and citronellene (3,7-dimethyl-1,6-octadiene) are precursor compounds.

Precursor compounds of formula IX which comprise a linking group may be made by methods commonly known to those skilled in the art. For example, compounds linked by a carbonate linkage as in formula X may be made through reaction of two equivalents of the compound of formula IX in which Q is $CH_2OH$ with one equivalent of a carbonate precursor such as phosgene. Compounds linked by a mono-ether linkage $CH_2]_2O$ as in formula XI may be made, for example, through reaction of one equivalent of the compound of formula IX in which Q is $CH_2OH$ with one equivalent of the compound of formula IX in which Q is $CH_2Br$ under Williamson conditions, or through reduction of the corresponding mono-ester of formula XIII. Compounds linked by a di-ether linkage $CH_2O]_2R^{13}$ as in formula XII may be made, for example, through reaction of two equivalents of the compound of formula IX in which Q is $CH_2OH$ with one equivalent of an alkyl bis(halide) or an aryl bis(halide) under Williamson conditions, or through reaction of two equivalents of the compound of formula IX in which Q is $CH_2Br$ or $CH_2Cl$ with one equivalent of an alkyl bis(alcohol) or an aryl bis(alcohol) under Williamson conditions, or through reduction of the corresponding mono-ester of formula XIV; or through reduction of the corresponding di-ester of formula XV. Compounds linked by a mono-ester linkage $(C=O)OCH_2$ as in formula XIII may be made, for example, through reaction of one equivalent of the compound of formula IX in which Q is $CH_2OH$ or $CH_2Br$ with one equivalent of the compound of formula IX in which Q is $CO_2H$ (or a reactive derivative thereof, such as an acyl halide, anhydride, ester, or related species) under appropriate conditions. Compounds linked by a di-ester linkage $(C=O)O]_2R^{14}$ as in formula XIV may be made, for example, through reaction of two equivalents of the compound of formula IX in which Q is $CO_2H$ (or a reactive derivative thereof, such as an acyl halide, anhydride, ester, or related species) with one equivalent of an alkyl bis (alcohol) or an aryl bis(alcohol) under appropriate conditions. Compounds linked by a di-ester linkage $CH_2O(C=O)]_2R^{15}$ as in formula XV may be made, for example, through reaction of two equivalents of the compound of formula IX in which Q is $CH_2OH$ or $CH_2Br$ with one equivalent of an alkyl bis(carboxylic acid) or an aryl bis (carboxylic acid) (or a reactive derivative thereof, such as acyl halide, anhydride, ester, or related species) under appropriate conditions.

In the phenolic reactant of formula XVI $R^{11}$ independently at each occurrence represents alkyl or halogen, and suitable values for n are 0–3 inclusive. Preferably, n has the value of 0–2, more preferably 0–1, and most preferably 0. When the value of n is not zero, then $R^{11}$ is preferably methyl or bromine or a combination thereof, and said substituent (or substituents) is (are) most often present in one or more ortho positions relative to the phenolic group. Thus, in another preferred embodiment n has the value of one and $R^{11}$ is a methyl group ortho to the phenolic group. Thus, in still another preferred embodiment n has the value of one, $R^{11}$ is a pentadecyl group meta to the phenolic group, and the phenolic reactant of formula XVI is derived from hydrocardanol.

The synthesis of phenolic compounds of the invention may be performed by combining at least one precursor compound of formula IX with at least a stoichoimetric amount of at least one phenolic reactant of formula XVI under reactive conditions in the presence of at least one acidic material added in a catalytic amount. Typically, the phenolic reactant is added in excess of the precursor compound. The process may be carried out batchwise, semi-continuously, or continuously.

The identity of the acidic material is not particularly critical provided that it effects reaction between a precursor compound of the formula IX and a phenolic reactant of formula XVI. Typical acidic materials include inorganic acids, such as sulfuric acid, hydrochloric acid and the like; organic acids, such as methanesulfonic acid, triflic acid, and the like; solid acidic materials, such as acidic clays, acidic zeolites, or acidic resins. The preferred acidic material is at least one acidic polymeric resin. Acidic polymeric resins are typically solids which can be easily removed from a reaction mixture by filtration following reaction. The identity of the resin is not particularly critical so long as it can effect reaction between precursor compound and phenolic reactant when it is present in a catalytic amount. Suitable acidic polymeric resins include those based on crosslinked polystyrenes, crosslinked acrylates, and their copolymers. Illustrative acidic functionalities include carboxylic acid and sulfonic acid; sulfonic acid is preferred. A particularly preferred class of acidic polymeric resins are the macroreticular sulfonic acid-functionalized polystyrene resins available under the tradename AMBERLYST from Rohm and Haas Company.

A solvent or diluent for the reactants may be used, although preferably the reaction is performed without added solvent or diluent. The reaction mixture is typically heated to a temperature in a range effective to provide reaction; preferably, the reaction mixture is heated to a temperature in a range between about 30° C. and the boiling point of the mixture; more preferably, to a temperature in a range between about 40° C. and about 120° C.; and most preferably to a temperature in a range between about 50° C. and about 70° C. The reaction is typically heated for a time until reaction is complete, as measured, for example, by complete consumption of starting material. Preferably the reaction time is between about 0.5 and about 24 hours; more preferably, the reaction time is between about 1 and about 16 hours; most preferably, the reaction time is between about 2 and about 12 hours. Following the reaction period, the acidic polymeric resin may be removed by any convenient means, such as by one or more steps of centrifugation and, preferably, filtration. The acidic polymeric resin may be recovered, regenerated, if necessary, by conventional means and reused in subsequent reactions. Any excess reactants and solvent or diluent (if either is present) may be removed from the mixture by known means such as extraction or vacuum distillation. In particular, if the phenolic compound is to be used in a subsequent polymerization procedure, then any excess phenolic reactant remaining may be beneficially removed at this point. The phenolic compound product may be used directly in any subsequent process without further purification or may be further purified by any convenient means such as one or more steps of extraction, washing, recrystallization, distillation, drying, and the like.

The phenolic compounds of the invention may be used in applications typical for compounds bearing at least two reactive functional groups, at least one of which is a phenolic moiety. For example, phenolic compounds of the formula I may serve as monomers for formation of polymers, particularly condensation polymers. Thus, in another embodiment the present invention comprises polymers made from the phenolic compounds of the formula I.

In particular, phenolic compounds of the formula I bearing two phenolic moieties (hereinafter sometimes referred to as a bisphenolic compound of formula I or bisphenolic compound of the appropriate fromula) may serve as aliphatic "soft-blocks" in polycarbonate synthesis. Such polycarbonates are useful, for example, in applications requiring improved flow and lower glass transition temperature compared to common polycarbonates not containing soft-block segments. Polycarbonates of the present invention may be made through combining at least one bisphenolic compound of the formula I with at least one dihydric phenol and a carbonate precursor under reactive conditions.

In preferred embodiments the polycarbonate is derived from at least one bisphenolic compound of the formula I in which k is one and G is a phenolic moiety of formula II or k is two and G is a linking moiety, wherein the linking moiety is any of the six species i–vi described hereinabove. In preferred embodiments $R^1$ and $R^2$ independently at each occurrence are methyl. Preferably the polycarbonate is derived from at least one bisphenolic compound of the formula I in which $R^3$, $R^4$, $R^5$, $R^6$, $R^7$, $R^8$, $R^9$, and $R^{10}$ independently at each occurrence represent hydrogen or $C_{1-4}$ alkyl, and more preferably in which $R^3$, $R^4$, $R^5$, $R^6$, $R^7$, $R^8$, $R^9$, and $R^{10}$ independently at each occurrence represent hydrogen or $C_{1-2}$ alkyl, and x, y, and z independently at each occurrence are 0–2, wherein the sum of each x+y+z grouping is at least 2. In particularly preferred embodiments the polycarbonate is derived from a bisphenolic compound corresponding to either a (2,6-bis[methylhydroxyphenyl]-2, 6-dimethyloctane) of formula XIX, or a bisphenolic compound containing a diester linkage as in formula XXI, or a bisphenolic compound containing a mono-ester linkage as in formula XXII.

In another embodiment phenolic compounds of the formula I bearing a phenolic moiety and a carboxylic acid or derivative thereof (hereinafter sometimes referred to as a phenolic-acid compound of formula I) may serve as aliphatic "soft-blocks" in polyestercarbonate synthesis. Such polyestercarbonates are useful in applications requiring improved flow and lower glass transition temperature compared to common polyestercarbonates not containing soft-block segments. Polyestercarbonates of the present invention may be made through combining at least one phenolic-acid compound of the formula I with at least one dihydric phenol and a carbonate precursor under reactive conditions.

In preferred embodiments the polyestercarbonate is derived from at least one phenolic-acid compound of the formula I in which k is one and G is $CO_2H$, COCl, or $CO_2R^{12}$, or $CO_2M$, wherein $R^{12}$ is alkyl, aralkyl, alkaryl, or aryl, particularly phenyl; and wherein M is a quaternary ammonium cation, a guanidinium cation, or sodium. In preferred embodiments $R^1$ and $R^2$ are each methyl. Preferably the polyestercarbonate is derived from at least one phenolic-acid compound of the formula I in which $R^3$, $R^4$, $R^5$, $R^6$, $R^7$, $R^8$, $R^9$, and $R^{10}$ independently at each occurrence represent hydrogen or $C_{1-4}$alkyl, and more preferably in which $R^3$, $R^4$, $R^5$, $R^6$, $R^7$, $R^8$, $R^9$, and $R^{10}$ independently at each occurrence represent hydrogen or $C_{1-2}$alkyl, and x, y, and z are each 0–2, wherein the sum of x+y+z is at least 2. In particularly preferred embodiments the polyestercarbonate is derived from a phenolic-acid compound corresponding to 7-hydroxyphenyl-citronellic acid of formula XVII.

Suitable dihydric phenols for preparing either polycarbonates or polyestercarbonates include those represented by the formula XXVIII:

HO—D—OH (XXVIII)

wherein D is a divalent aromatic radical. Preferably, D has the structure of formula XXIX;

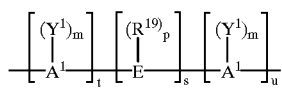

(XXIX)

wherein $A^1$ represents an aromatic group such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group (e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^{19}$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as $R^{19}$ above, or an oxy group such as OR; it being only necessary that $Y^1$ be inert to and unaffected by the reactants and reaction conditions used to prepare the polyestercarbonate. The letter m represents any integer from and including zero through the number of positions on $A^1$ available for substitution; p represents an integer from and including zero through the number of positions on E available for substitution; t represents an integer equal to at least one; s is either zero or one; and u represents any integer including zero.

In the dihydric phenol compound in which D is represented by formula XXIX above, when more than one Y substituent is present, they may be the same or different. The same holds true for the $R^{19}$ substituent. Where s is zero in formula XXIX and u is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of dihydric phenols of formula XXVIII include the dihydroxy-substituted aromatic hydrocarbons disclosed by name or formula (generic or specific) in U.S. Pat. No. 4,217,438, which is incorporated herein by reference. Some preferred examples of dihydric phenols include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl) propane (commonly known as bisphenol-A); 2,2-bis(4-hydroxy-3,5-dimethylphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,4'-dihyroxydiphenylmethane; bis(2-hydroxyphenyl) methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl) cyclohexylmethane; 2,2-bis(4-hydroxyphenyl)-1-phenylpropane; resorcinol; $C_{1-3}$ alkyl-substituted resorcinols.

Suitable dihydric phenols also include those containing spirobiindane structural units such as represented by the formula XXX:

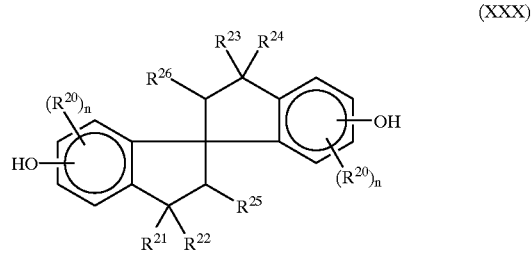

(XXX)

wherein each $R^{20}$ is independently selected from monovalent hydrocarbon radicals and halogen radicals; each $R^{21}$, $R^{22}$, $R^{23}$, and $R^{24}$ is independently $C_{1-6}$alkyl; each $R^{25}$ and $R^{26}$ is independently H or $C_{1-6}$alkyl; and each n is independently selected from positive integers having a value of from 1 to 3 inclusive. The monovalent hydrocarbon radicals represented by $R^{20}$ include alkyl radicals, cycloalkyl radicals, aryl radicals, aralkyl radicals, and alkaryl radicals. Alkyl radicals represented by $R^{20}$ are preferably those containing from 1 to about 12 carbon atoms, and include branched alkyl radicals and straight chain alkyl radicals. Some illustrative non-limiting examples of these alkyl radicals include methyl, ethyl, propyl, isopropyl, butyl, tertiarybutyl, pentyl, neopentyl, and hexyl. Cycloalkyl radicals represented by $R^{20}$ are preferably those containing from 3 to about 12 ring carbon atoms. Some illustrative non-limiting examples of these cycloalkyl radicals include cyclobutyl, cyclopentyl, cyclohexyl, methylcyclohexyl, cycloheptyl. Aryl radicals represented by $R^{20}$ are preferably those containing from 6 to 12 ring carbon atoms. Some illustrative non-limiting examples of these aryl radicals include phenyl, biphenyl, naphthyl. Preferred aralkyl and alkaryl radicals represented by $R^{20}$ are those containing from 7 to about 14 carbon atoms. These include, but are not limited to, benzyl, ethylphenyl, phenylbutyl, phenylpropyl, propylphenyl, and phenylethyl. The preferred halogen radicals represented by $R^{20}$ are fluorine, chlorine and bromine.

In the dihydric phenol compound of formula XXX when more than one $R^{20}$ substituent is present they may be the same or different. The relative positions of the hydroxyl groups and $R^{20}$ on the aromatic nuclear residues may be varied in the ortho or meta positions. The position of each hydroxy group is independently at any unsubstituted site on each of the aromatic rings. More preferably each hydroxy group is independently in positions 5 or 6 and 5' or 6' of each aromatic ring. Most preferably each hydroxy group is in position 6 and 6' of each aromatic ring.

Preferably, each $R^{20}$ is independently selected from chlorine, bromine, and lower alkyl radicals containing from 1 to about 5 carbon atoms, each $R^{21}$, $R^{22}$, $R^{23}$, and $R^{24}$ is independently $C_{1-6}$ alkyl; each $R^{25}$ and $R^{26}$ is independently H or $C_{1-6}$ alkyl; and each n is independently 0 to 3. More preferably, each $R^{20}$ is independently selected from chlorine and lower alkyl radicals containing from 1 to about 3 carbon atoms, each $R^{21}$, $R^{22}$, $R^{23}$, and $R^{24}$ is independently $C_{1-2}$ alkyl; each $R^{25}$ and $R^{26}$ is independently H or $C_{1-2}$ alkyl; and each n is independently 0 to 2. Still more preferably, each $R^{21}$, $R^{22}$, $R^{23}$, and $R^{24}$ is methyl; each $R^{25}$ and $R^{26}$ is H; and each n is 0.

The spiro dihydric phenols of formula XXX are compounds that are known in the art and are commercially available or may be readily prepared by known methods. Methods of preparation include those described in U.S. Pat. No. 4,701,566; and by R. F. Curtis and K. O. Lewis in Journal of the Chemical Society (England), 1962, p. 420; and by R. F. Curtis in Journal of the Chemical Society (England), 1962, p. 417. In one illustrative, non-limiting example these spiro dihydric phenols may be conveniently prepared by (i) reacting two moles of a phenolic compound with one mole of a carbonyl-containing compound such as acetone, and (ii) thereafter coreacting 3 moles of the product of (i) under acidic conditions to form the spiro dihydric phenol and 4 moles of a phenolic compound. The acids which may be utilized in (ii) can include such acids as anhydrous methane sulfonic acid, anhydrous hydrochloric acid, and the like.

The most preferred spiro dihydric phenol for forming polyestercarbonates suitable for use in the present invention is 6,6'-dihydroxy-3,3,3',3'-tetramethyl-1,1'-spirobiindane ("SBI"), in which n in formula XXX is 0 and the linkages with the rest of the polymer molecule are in a specific position on the aromatic rings.

In the preparation of suitable polyestercarbonates the dihydric phenols described above may be used alone or as mixtures of two or more different dihydric phenols. For reasons of availability and particular suitability for the purposes of this invention, a preferred dihydric phenol is 2,2-bis(4-hydroxyphenyl)propane (bisphenol-A or "BPA"), in which D in formula XXVIII is bis(4-phenyl) isopropylidene. Preferred examples of mixtures of two or more dihydric phenols which may be employed with phenolic compounds of the formula I to prepare either polycarbonates or polyestercarbonates include mixtures of bisphenol-A and 1,1-bis(4-hydroxy-3-methylphenyl)cyclohexane.

The carbonate precursor for preparing either polycarbonates or polyestercarbonates may be at least one carbonyl halide, carbonate ester or haloformate. The carbonyl halides which can be employed herein are carbonyl chloride, carbonyl bromide and mixtures thereof. Typical of carbonate esters which may be employed herein are diphenylcarbonate, di(halophenyl)carbonates, such as di(chlorophenyl)carbonate, di(bromophenyl)carbonate, di(trichlorophenyl)carbonate, di(tribromophenyl)carbonate, etc.; di(alkylphenyl)carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (such as bischloroformates of hydroquinone, bisphenol-A, 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane, and the like; including bischloroformate-terminated polycarbonate oligomers of hydroquinone, bisphenol-A, 6-hydroxy-1-(4'-hydroxyphenyl)-1,3,3-trimethylindane, 4,4'-(3,3,5-trimethylcyclohexylidene)diphenol, 1,1-bis(4-hydroxy-3-methylphenyl)cyclohexane, or the like) or glycols (such as bishaloformates of ethylene glycol, neopentyl glycol, polyethylene glycol, etc.). Mixtures of haloformates may be employed. Carbonyl chloride, also known as phosgene, is preferred.

Reactive conditions for preparing polycarbonates of the invention include interfacial processes and melt processes. If the interfacial process is used, the addition of various phase transfer catalysts is optional. Phase transfer catalysts which are suitable include, but are not limited to tertiary amines, such as triethylamine, ammonium salts, such as tetrabutylammonium bromide; or hexaethylguanidinium chloride.

The polycarbonates as described may also be prepared by the melt or transesterification process. This process does not require the use of phosgene or a solvent and minimizes the formation of low molecular weight contaminants, such as cyclic and linear low molecular weight oligomers in the final polymer. The monomers are typically mixed with a carbonate source, such as a diarylcarbonate, and a small amount of catalyst, such as an alkali metal hydroxide or ammonium hydroxide and heated under a vacuum according to a protocol in which the temperature is raised through a series of stages while the pressure in the headspace over the reaction mixture is lowered from ambient pressure to about 1 Torr.

Suitable carbonate sources, catalysts and reaction conditions are found in U.S. Pat. No. 5,880,248, and *Kirk-Othmer Encyclopedia of Chemical Technology*, Fourth Edition, Volume 19, pp. 585–600, herein incorporated by reference. The time of the stages and the temperature are such that mechanical losses of material through foaming and the like are avoided. Phenol and excess diphenyl carbonate may be removed overhead to complete the polymerization process. The product high polymer may then be isolated as a melt which may be compounded with other additives, such as stabilizers and mold release agents prior to pelletization. The products produced by the melt process typically have reduced numbers of undissolved particles and reduced content of low molecular weight contaminants, such as cyclic oligomers, relative to the interfacially produced product.

The preferred polycarbonates have a weight average molecular weight of about 5,000 to about 100,000, more preferably of about 10,000 to about 65,000, and most preferably about 18,000 to about 36,000 as measured by gel permeation chromatography versus polystyrene standards.

The proportions of reactants employed to prepare the polycarbonate resins will vary in accordance with the expected end-use application of the resins. In general, the amount of phenolic compound of formula I in the resin may be from about 0.5 to about 30 mole percent, preferably from about 1 to about 20 weight percent, and more preferably from about 1 to about 10 weight percent, relative to the dihydric phenol compound. These amounts of phenolic compound of formula I are applicable no matter whether a single dihydric phenol or a mixture of two or more dihydric phenols is used to prepare the polycarbonate.

Reactive conditions for preparing polyestercarbonates of the instant invention include known processes such as interfacial polymerization or phase boundary separation, transesterification, solution polymerization, melt polymerization, transesterification, and the like. Various polymerization processes are disclosed, for example, in U.S. Pat. Nos. 3,030,331; 3,169,121; 3,207,814; 5,025,081; 5,321,114; and 5,494,997.

Although the processes may vary, several of the preferred processes typically involve dissolving or dispersing the reactants in a suitable water-immiscible solvent medium, and contacting the reactants with a carbonate precursor, such as phosgene, in the presence of a suitable catalyst and at least one acid acceptor under controlled pH conditions. The most commonly used water-immiscible solvents include methylene chloride, 1,2-dichloroethane, chlorobenzene, toluene, and the like. Representative catalysts include but are not limited to tertiary amines such as triethylamine, quaternary phosphonium compounds, quaternary ammonium compounds, hexaalkyl guanidinium halides, crown ethers and the like. Examples of suitable acid acceptors include tertiary amines, alkali or alkaline earth metal hydroxides, and the like. In typical embodiments sodium hydroxide is a preferred acid acceptor. The temperature at which the polymerization reaction proceeds may vary from below 0° C., to above 100° C. Preferably, the temperature of polymerization varies from about –20° C. to about 100° C., and most preferably from about room temperature (25° C.) to about 50° C. Since the reaction is exothermic, the addition rate of carbonyl precursor, such as phosgene, may be used to control the reaction temperature. The amount of carbonyl precursor required will generally depend upon the amount of the dihydric phenol reactant added.

In an alternative method of preparation at least one dihydric phenol is reacted with at least one phenolic-acid compound of the formula I or corresponding reactive derivative such as an acid halide under alkaline conditions in a molar ratio such as to provide a hydroxy-terminated polyester oligomer. The degree of polymerization (DP) of the polyester oligomer is at least about 4, preferably at least about 10, more preferably at least about 20, and most preferably about 30 to about 150. The oligomer is then treated with dihydric phenol and carbonate precursor by standard methods to form a polyestercarbonate in which the DP of the carbonate blocks is generally at least about 10, preferably at least about 20, and most preferably about 50–200. In a preferred embodiment the dihydric phenol is bisphenol-A, the at least one phenolic-acid compound of the formula I is 7-hydroxyphenyl-citronellic acid, and the carbonate precursor is phosgene.

In any process for preparing polycarbonate or polyestercarbonate a molecular weight regulator, that is a chain stopper, may be optionally added to the reactants prior to or during contacting them with a carbonate precursor. Useful molecular weight regulators include, but are not limited to, monohydric phenols such as phenol, chroman-I, para-tertiarybutylphenol, isooctylphenol, isononylphenol, p-cumylphenol, and the like. The chainstoppers are usually present at a level in the range of about 0.1 to about 10 mole percent, preferably about 4 to about 10 mole percent, and more preferably about 4 to about 7 mole percent based on the amount of dihydric phenol being employed. Techniques for the applying one or more chain stoppers are well known in the art and may be used in the any relevant process for controlling the molecular weight of the polyestercarbonate resins.

The preferred polyestercarbonates, including copolymers and terpolymers containing more than one dihydric phenol and/or more than one phenolic compound of formula I, have a weight average molecular weight of about 5,000 to about 100,000, more preferably of about 10,000 to about 65,000, and most preferably about 18,000 to about 36,000 as measured by gel permeation chromatography versus polystyrene standards.

The proportions of reactants employed to prepare the polyestercarbonate resins will vary in accordance with the expected end-use application of the resins. In general, the amount of phenolic compound of formula I in the resin may be from about 0.5 to about 30 mole percent, preferably from about 1 to about 20 weight percent, and more preferably from about 1 to about 10 weight percent, relative to the dihydric phenol compound. These amounts of phenolic compound of formula I are applicable no matter whether a single dihydric phenol or a mixture of two or more dihydric phenols is used to prepare the polyestercarbonate.

Articles prepared from either the polycarbonates or the polyestercarbonates are another embodiment of the present invention. Such articles include thin wall moldings and optical media. "Optical media" as used herein includes optical disks and optical data storage media, for example a compact disk (CD audio, CD video, or CD-ROM), a digital versatile disk, also known as DVD (ROM, RAM, rewritable), a magneto optical (MO) disk, computer hard drives, such as CD-R and CD-RW drives, and the like; optical lenses, such as contact lenses, lenses for glasses, lenses for telescopes, and prisms; optical fibers; wave guides; information recording media; information transferring media; high density data storage media, disks for video cameras, disks for still cameras and the like; as well as the substrate onto which optical recording material is applied. In addition to use as a material to prepare optical articles, the polycarbonates and polyestercarbonates may be used as a raw material for films or sheets.

In order that those skilled in the art will be better able to practice the invention, the following examples are given by way of illustration and not by way of limitation. All molecular weight measurements were performed by gel permeation chromatography (GPC) versus polystyrene standards.

EXAMPLE 1

This example illustrates the synthesis of a phenolic compound of the formula I from a precursor compound of formula IX. A 100 milliliter (mL) three neck round bottom flask was equipped with a nitrogen bubbler and reflux condenser. To this was added 0.5 grams (g) of AMBERLYST-15 resin, 10.15 g (0.0734 moles) of citronellene (3,7-dimethyl-1,6-octadiene), and 31.29 g (0.289 moles) of o-cresol. The reaction was magnetically stirred and heated to 70° C. for 2 days, at which point gas chromatographic (GC) analysis showed complete consumption of starting material (>90% GC yield). Gas chromatography-mass spectroscopy (GC-MS) analysis indicated the major product to be consistent with the compound of formula XIX. A sample of material was purified by column chromatography on silica gel using gradient elution with methanol-chloroform. The proton nuclear magnetic resonance spectroscopy ($^1$H-NMR) spectrum of the purified sample was consistent with formula XIX (2,6-bis[methylhydroxyphenyl]-2,6-dimethyloctane) as a mixture of compounds with a total ortho:para ratio of about 2:3.

EXAMPLE 2

This example illustrates the synthesis of a phenolic compound of the invention derived from phenol and citronellic acid. Phenol (162 g, 1.72 moles) was combined with citronellic acid (3,7-dimethyl-6-octenoic acid) (64 g, 0.376 moles) and AMBERLYST-15 resin (3.25 g) in a flask under inert atmosphere. The contents of the flask were heated to 70° C. for 4 hours. The mixture was diluted with hot toluene (100 mL) and then rapidly filtered through a glass frit to remove the AMBERLYST resin. The crude reaction product was stripped of excess phenol under vacuum to provide a slightly yellow, thick oil. Analysis of the oil by $^1$H-NMR and GC-MS showed a structure consistent with 3,7-dimethyl-7-hydroxyphenyl-octanoic acid with ortho:para ratio approximately 3:7. The product was subjected to Kugelrohr distillation at 160° C./100 mTorr to provide colorless monomer.

EXAMPLE 3

This example illustrates a procedure which may be used for the synthesis of a phenolic compound of the invention derived from hydrocardanol and citronellic acid. Citronellic acid is combined with about 4.5 molar equivalents of hydrocardanol in the presence of an effective amount of AMBERLYST-15 resin in a flask under inert atmosphere. The contents of the flask are heated to about 70° C. for about 4 hours. The mixture is diluted with hot toluene and then rapidly filtered through a glass frit to remove the AMBERLYST resin. The crude reaction product is stripped of excess hydrocardanol under vacuum. Analysis of the oil by $^1$H-NMR and GC-MS shows a structure consistent with 3,7-dimethyl-7-[pentadecyl-hydroxyphenyl]-octanoic acid.

EXAMPLE 4

This example illustrates melt polymerization of 7-hydroxyphenyl-citronellic acid with a bisphenol. Bisphenol-A (5.09 g, 2.23×10$^{-2}$ moles), diphenyl carbonate (5.00 g, 2.33×10$^{-2}$ moles), 7-hydroxyphenyl-citronellic acid (0.233 g, 8.808×10$^{-4}$ moles) and aqueous sodium hydroxide (9.8×10$^{-8}$ moles; 98 microliters of 0.001M solution) were combined under an inert atmosphere and heated to 220° C. in a glass reactor with an overhead stirrer. The reaction was stirred at atmospheric pressure for about four hours, and then a vacuum (100 mmHg) was applied to initiate phenol distillation. The temperature and vacuum were steadily increased over three hours until 290° C. at 100 mTorr was attained. At this point, the polymer appeared thick and very slightly yellow. The polymer was allowed to cool under vacuum. The polymer was dissolved in minimal methylene chloride and precipitated with excess isopropyl alcohol in a blender. The polymer was filtered, washed with isopropyl alcohol, and then dried under vacuum for 12 hours at 100° C. to obtain a flocculent white powder. Analysis of the powder by $^1$H-NMR was consistent with a structure having repeating units as shown in formula XXXI where the ratio m:p equals about 100:5. The polymer showed a weight average molecular weight (Mw) of 28,086 and a number average molecular weight (Mn) of 13,417 by gel permeation chromatography versus polystyrene standards. The polymer had a glass transition temperature (Tg) of 135.7° C. as determined by differential scanning calorimetry (DSC) analysis under nitrogen at 20° C. per minute heating rate.

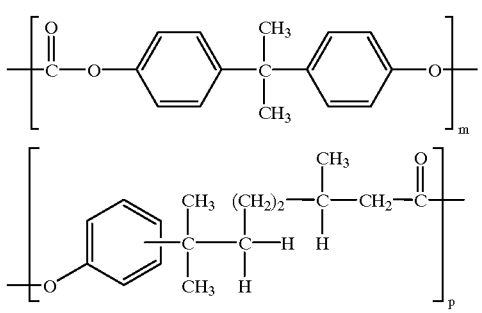

(XXXI)

EXAMPLE 5

This example illustrates melt polymerization of the bisphenol XIX with a mixture of bisphenols. In a cylindrical glass reactor equipped with an overhead stirrer and connecting distillation trap, diphenyl carbonate (12.280 g, 0.057 moles), bisphenol-A (11.547 g, 0.051 moles), and the bisphenol XIX (2,6-bis[methylhydroxyphenyl]-2,6-dimethyloctane) (1.993 g, 0.006 moles) were combined. Catalyst solutions were then injected (75 microliters of 0.001 M aqueous sodium hydroxide and 14 microliters of 1.0 M aqueous tetramethylammonium hydroxide). The reactor was repeatedly evacuated and refilled with argon until the oxygen content was substantially minimized. The monomers were melted and stirred for 30 minutes from 140 to 180° C., under argon. Then, over the course of 215 minutes, the temperature was raised to 300° C. and the vacuum lowered to 0.5 millibar. Phenol was observed to distill out of the reactor into the distillation trap throughout the polymerization. The reactor was repressurized with argon and the polymer allowed to cool to room temperature. $^1$H-NMR of the resin was consistent with polymer containing approximately 10 mole % XIX in the sample. The number average molecular weight (Mn) of the material was 37,030 and the Tg was 138° C.

EXAMPLE 6

This example illustrates a procedure which may be used for melt polymerization of the mono-ester bisphenolic compound with a mixture of bisphenols. Bisphenol-A (BPA; 0.493 moles), 1,1-bis(4-hydroxy-3-methylphenyl) cyclohexane (BHMC; 0.493 moles), diphenyl carbonate (1.153 moles), the mono-ester bisphenolic compound of formula XXII (0.063 moles), aqueous sodium hydroxide (1.048×10$^{-6}$ moles; added in the form of a 0.001M solution), and aqueous tetramethylammonium hydroxide (2.62×10$^{-4}$ moles, added in the form of a 1.0 M solution) are combined under an inert atmosphere. The reactor is repeatedly evacuated and refilled with nitrogen until the oxygen content is substantially minimized (preferably below 100 ppm). The monomers are melted (heating from 140 to 180° C.) and stirred for 30 minutes under nitrogen. Then over the course of 210 minutes the temperature is raised to about 310° C. and the vacuum lowered to about 1.5 millibar. Phenol distills out of the reactor into an adjoining chilled trap throughout the polymerization. The reactor is repressurized with nitrogen and the molten terpolymer resin is expelled. Analysis of the product by $^1$H-NMR shows the expected structure having a molar ratio of BPA:BHMC:compound XXII equal to about 47:47:6. The resin shows a weight average molecular weight (Mw) in the range of 10,000 to 65,000 by gel permeation chromatography versus polystyrene standards.

EXAMPLE 7

The procedure of Example 6 is repeated except that 7-hydroxyphenyl-citronellic acid is substituted for the mono-ester bisphenolic compound of formula XXII. Analysis of the product by $^1$H-NMR shows the expected structure having a molar ratio of BPA:BHMC:7-hydroxyphenyl-citronellic acid equal to about 47:47:6. The resin shows a weight average molecular weight (Mw) in the range of 10,000 to 65,000 by gel permeation chromatography versus polystyrene standards.

EXAMPLE 8

This example illustrates interfacial polymerization of 7-hydroxyphenyl-citronellic acid with bisphenol-A. Into a 500 mL Morton flask was placed bisphenol-A (22.8 g, 100 mmol), 7-hydroxyphenyl-citronellic acid (2.5 g, 10 mmol), p-cumylphenol (0.84 g, 4 mol %), 125 mL methylene chloride, 90 mL of water and triethylamine (125 microliters, 2 mol %). The pH was adjusted to 8.5 with 50 wt % sodium hydroxide. Phosgene was added at 0.6 g/minute. At 7.0 g of phosgene (70 mol % equivalent) the pH was raised to 10.5 over a period of one minute through addition of sodium hydroxide solution. Phosgene was continued until 20 mol % excess (12.6 g, 126 mmol) was added. The polymer solution was separated from the brine, washed one time with 0.1 N hydrochloric acid and four times with deionized water followed by steam crumbing in a blender with boiling water. The polymer was filtered, washed with water and dried under vacuum at 110° C. for 16 hours. Analysis by $^1$H-NMR was consistent with the polymeric structure in formula XXXI where the ratio m:p equals about 100:9. The polymer showed a weight average molecular weight (Mw) of 27,400 and a number average molecular weight (Mn) of 10,600 by gel permeation chromatography versus polystyrene standards. The polymer had a glass transition temperature (Tg) of 124.5° C. as determined by DSC analysis under nitrogen at 20° C. per minute heating rate.

EXAMPLE 9

This example illustrates a procedure which may be used for interfacial polymerization of the 7-hydroxyphenyl-citronellic acid with a mixture of bisphenols. A 100 L phosgenator is charged with 1,1-bis(4-hydroxy-3-methylphenyl)cyclohexane (BHMC; 22.2 mol), BPA (22.2 mol), 7-hydroxyphenyl-citronellic acid (2.83 mol), methylene chloride (42 L), distilled water (42 L), p-cumylphenol (600 g, 2.83 mol, 6.0 mol %), triethylamine (89 mL, 1.35 mol %) and methyltributylammonium chloride (1067 mL of a 33 wt % aqueous solution, 3.18 mol %). Sodium hydroxide (500 g of a 50 wt % aqueous solution) is added and the reaction is mixed for about 5 minutes. Phosgene (3273 g, 33.1 mol, 70 mol % equivalence) is added at 125 g/min maintaining the pH at 8.5 by the addition of the NaOH solution. The pH is ramped to 10.5 over about 1.5 minutes and phosgene continued until 61.5 mol, (30 mol % excess) is added. The polymer solution is diluted with methylene chloride (35 L), is separated from the brine, washed two times with 1N HCl and six times with distilled water. The polymer is isolated by steam precipitation and dried overnight at 120° C. under nitrogen. The dried polymer shows weight average molecular weight (Mw) in the range of 10,000 to 65,000 (by GPC vs. polystyrene standards). Terpolymers with 48/48/4 and 49/49/2 ratio of BHMC/BPA/7-hydroxyphenylcitronellic acid may be prepared by similar procedure.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A phenolic compound bearing at least two functional groups, at least one of which is a phenolic moiety, of the formula I:

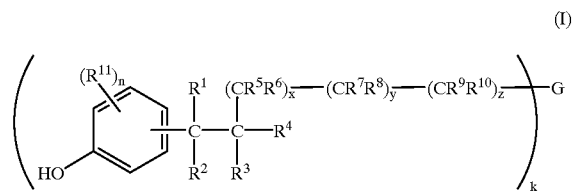

(I)

wherein $R^1$ and $R^2$ independently at each occurrence represent alkyl or aralkyl; the free valence bond linking the aryl ring to the alpha-carbon atom independently at each occurrence is either ortho or para to the phenolic group, or a mixture of ortho and para isomers; $R^3$, $R^4$, $R^5$, $R^6$, $R^7$, $R^8$, $R^9$, and $R^{10}$ independently at each occurrence represent hydrogen, alkyl or aralkyl; $R^{11}$ independently at each occurrence represents alkyl or halogen; n independently at each occurrence is 0–3; x, y, and z independently at each occurrence are 0–4, wherein the sum of each x+y+z grouping is at least 1; and either k is one and G represents $CH_2OH$, CHO, $CO_2H$, COCl, $CO_2R^{12}$, $CO_2M$ or

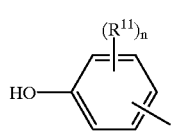

(II)

wherein $R^{12}$ is alkyl, aralkyl, alkaryl, or aryl; M is a cation; $R^{11}$ independently at each occurrence represents alkyl or halogen; n independently at each occurrence is 0–3; and the free valence bond in formula II is either ortho or para to the phenolic group, or a mixture of ortho and para isomers;

or k is two and G represents a linking moiety, wherein the linking moiety is either a carbonate linkage as in formula III:

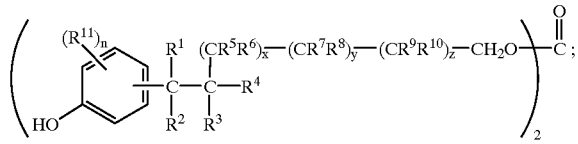

(III)

a mono-ether linkage $CH_2]_2O$ as in formula IV:

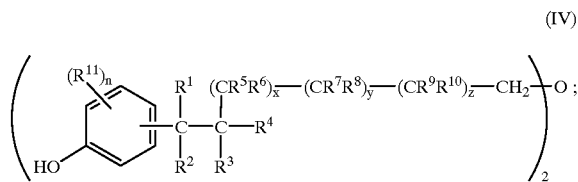

(IV)

a di-ether linkage $CH_2O]_2R^{13}$ as in formula V:

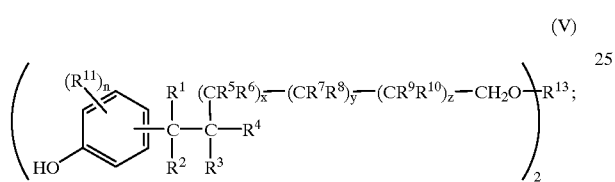

(V)

a mono-ester linkage $(C=O)OCH_2$ as in formula VI:

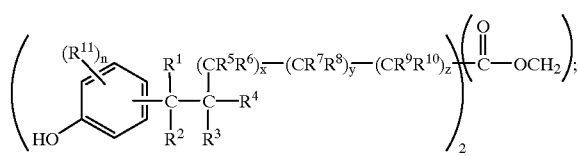

(VI)

a di-ester linkage $(C=O)O]_2R^{14}$ as in formula VII:

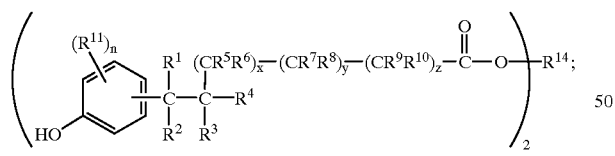

(VII)

or a di-ester linkage $CH_2O(C=O)]_2R^{15}$ as in formula VIII:

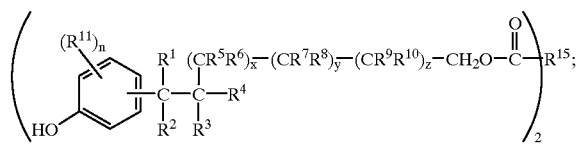

(VIII)

wherein $R^{13}$, $R^{14}$, and $R^{15}$ are alkyl, aralkyl, alkaryl, or aryl.

2. The compound of claim 1 in which $R^1$ and $R^2$ are methyl; $R^3$, $R^4$, $R^5$, $R^6$, $R^7$, $R^8$, $R^9$, and $R^{10}$ independently at each occurrence represent hydrogen or $C_{1-4}$ alkyl, and $R^{11}$ independently at each occurrence represents $C_{1-22}$ alkyl, and n is 0–3.

3. The compound of claim 1 in which $R^1$ and $R^2$ are methyl; $R^3$, $R^4$, $R^5$, $R^6$, $R^7$, $R^8$, $R^9$, and $R^{10}$ independently at each occurrence represent hydrogen or $C_{1-2}$ alkyl, and $R^{11}$ independently at each occurrence represents $C_{1-22}$ alkyl, and n is 0–1.

4. The compound of claim 3 in which x, y, and z are independently at each occurrence 0–2, wherein the sum of each x+y+z grouping is at least 2.

5. The compound of claim 4 in which k is one, and G is $CH_2OH$, $CO_2H$, $COCl$, $CO_2R^{12}$, or $CO_2M$, wherein $R^{12}$ is alkaryl or aryl; and wherein M is a quaternary ammonium cation, a guanidinium cation, or a quaternary phosphonium cation; or an alkali or alkaline earth metal cation.

6. The compound of claim 5 in which G is $CO_2H$.

7. The compound of claim 5 in which G is $CH_2OH$.

8. The compound of claim 5 in which G is $CO_2C_6H_5$.

9. The compound of claim 4 in which k is one, and G is (II)

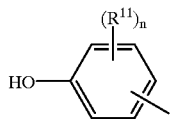

wherein $R^{11}$ represents $C_{1-22}$ alkyl, and n is 0–1; and the free valence bond in formula II is predominantly either ortho or para to the phenolic group.

10. The compound of claim 1 in which k is one, $R^1$ and $R^2$ are methyl; $R^3$ and $R^4$ are hydrogen; $R^5$ and $R^6$ are hydrogen and x is two; $R^7$ is hydrogen, $R^8$ is methyl, and y is one; $R^9$ and $R^{10}$ are hydrogen and z is one; $R^{11}$ is hydrogen; and G is either $CO_2H$, $COCl$, $CH_2OH$, $CHO$, $CO_2R^{12}$, or $CO_2M$, wherein $R^{12}$ is aryl or alkaryl; and wherein M is a quaternary ammonium cation, a guanidinium cation, or sodium, and in which the free valence bond linking the aryl ring to the alpha-carbon atom is predominantly para to the phenolic group, as in formula XVII:

(XVII)

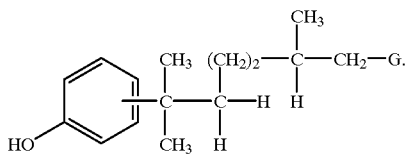

11. The compound of claim 10 in which G is $CO_2H$.
12. The compound of claim 10 in which G is $CH_2OH$.
13. The compound of claim 10 in which G is $CO_2C_6H_5$.
14. The compound of claim 1 in which k is one, $R^1$ and $R^2$ are methyl; $R^3$ and $R^4$ are hydrogen; $R^5$ and $R^6$ are hydrogen and x is two; $R^7$ is ethyl, $R^8$ is methyl, and y is one; z is zero; $R^{11}$ is methyl ortho to the phenolic group and n is one; and G is a phenolic group of formula II in which $R^{11}$ is methyl ortho to the phenolic group and n is one, and in which the free valence bond linking the aryl ring to the alpha-carbon atom is predominantly para to the phenolic group for each aryl substituent.

15. The compound of claim 1 in which k is one, $R^1$ and $R^2$ are methyl; $R^3$ and $R^4$ are hydrogen; $R^5$ and $R^6$ are hydrogen and x is two; $R^7$ is hydrogen, $R^8$ is methyl, and y is one; $R^9$ and $R^{10}$ are hydrogen and z is one; $R^{11}$ is pentadecyl meta to the phenolic group; and G is $CO_2H$; and in which the free valence bond linking the aryl ring to the alpha-carbon atom is predominantly ortho to the phenolic group and para to the pentadecyl group.

16. The compound of claim 1 in which k is two, and in each grouping $R^1$ and $R^2$ are methyl; $R^3$ and $R^4$ are hydrogen; $R^5$ and $R^6$ are hydrogen and x is two; $R^7$ is hydrogen, $R^8$ is methyl, and y is one; $R^9$ and $R^{10}$ are hydrogen and z is one; $R^{11}$ is hydrogen; and G is a linking group, as in formula XX:

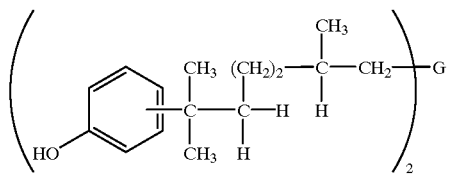

(XX)

wherein the linking moiety is either a carbonate linkage $CH_2O]_2(C=O)$; a mono-ether linkage $CH_2]_2O$; a di-ether linkage $CH_2O]_2R^{13}$; a mono-ester linkage $(C=O)OCH_2$; a di-ester linkage $(C=O)O]_2R^{14}$; or a di-ester linkage $CH_2O(C=O)]_2R^{15}$, wherein $R^{13}$, $R^{14}$, and $R^{15}$ are alkyl, aralkyl, alkaryl, or aryl; and wherein the free valence bond linking each aryl ring to the alpha-carbon atom is predominantly para to the phenolic group.

17. The compound of claim 16 in which the linking moiety is a carbonate linkage $CH_2O]_2(C=O)$.

18. The compound of claim 16 in which the linking moiety is a di-ether linkage $CH_2O]_2R^{13}$ and $R^{13}$ is an aryl residue derived from hydroquinone, resorcinol, or methylresorcinol.

19. The compound of claim 16 in which the linking moiety is a mono-ester linkage $(C=O)OCH_2$.

20. The compound of claim 16 in which the linking moiety is a di-ester linkage $(C=O)O]_2R^{14}$ and $R^{14}$ is an aryl residue derived from hydroquinone, resorcinol, or methylresorcinol.

21. The compound of claim 16 in which the linking moiety is a di-ester linkage $CH_2O(C=O)]_2R^{15}$ and $R^{15}$ is an aryl residue derived from terephthalic acid, isophthalic acid, or 2,6-naphthalenedicarboxylic acid.

22. The phenolic compound of formula XVII, in which G is $CO_2H$ (formula XVIIa) and the free valence bond linking the aryl ring to the alpha-carbon atom is predominantly para to the phenolic group:

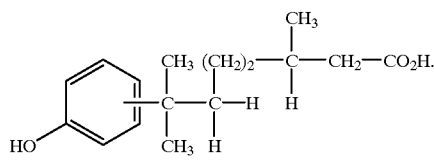

(XVIIa)

23. The phenolic compound of formula XVII, in which G is $CH_2OH$ (formula XVIIb) and the free valence bond linking the aryl ring to the alpha-carbon atom is predominantly para to the phenolic group:

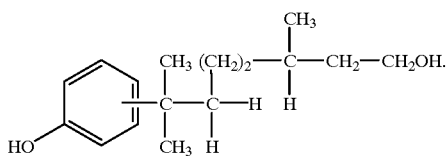

(XVIIb)

24. The phenolic compound of formula XIX in which the free valence bond linking each aryl ring to each alpha-carbon atom is predominantly para to the phenolic group:

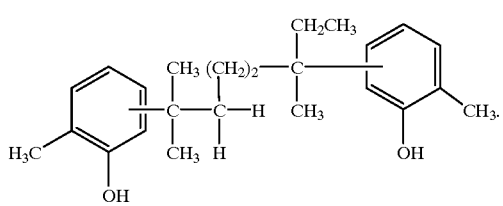

(XIX)

25. The phenolic compound of formula XXI in which the free valence bond linking each phenolic ring to each of the two alpha-carbon atoms is predominantly para to the phenolic group, and the di-ester linkages are para to each other:

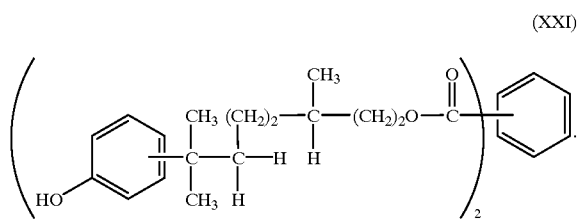

(XXI)

26. The phenolic compound of formula XXI in which the free valence bond linking each phenolic ring to each of the two alpha-carbon atoms is predominantly para to the phenolic group, and the di-ester linkages are meta to each other:

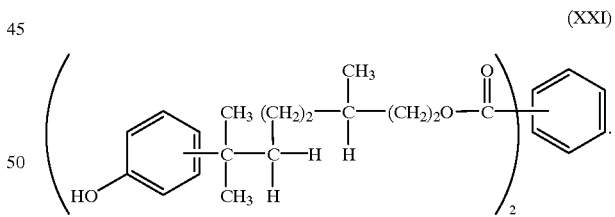

(XXI)

27. The phenolic compound of formula XXII in which the free valence bond linking each phenolic ring to each alpha-carbon atom is predominantly para to the phenolic group:

(XXI)

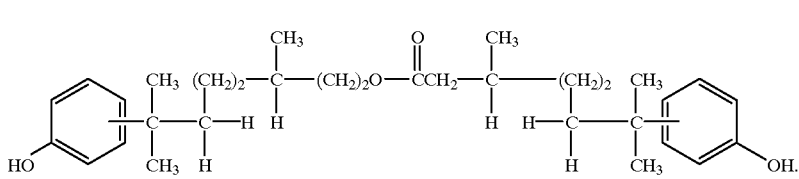

28. A method for making phenolic compounds which comprises combining in the presence of an acidic material:

A) a precursor compound of the formula IX:

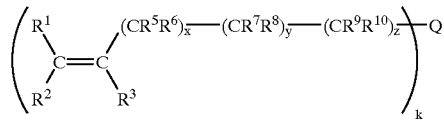

(IX)

wherein $R^1$ and $R^2$ independently at each occurrence represent alkyl or aralkyl; $R^3$, $R^5$, $R^6$, $R^7$, $R^8$, $R^9$, and $R^{10}$ independently at each occurrence represent hydrogen, alkyl, or aralkyl; x, y, and z independently at each occurrence are 0–4, wherein the sum of each x+y+z grouping is at least 1;

and either k is one and Q is $CH_2Br$, $CH_2Cl$, $CH_2OH$, CHO, $CO_2H$, COCl, $CO_2R^{12}$, $CO_2M$, $R^{16}C=CR^{17}R^{18}$, or

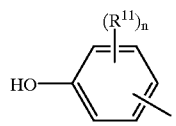

(II)

wherein the free valence bond linking the aryl ring to the alpha-carbon atom is either ortho or para to the phenolic group, or a mixture of ortho and para isomers; $R^{11}$ independently at each occurrence represents alkyl or halogen; n is 0–3; $R^{12}$ is alkyl, aralkyl, alkaryl, or aryl; M is a cation; and $R^{16}$, $R^{17}$, and $R^{18}$ are each independently hydrogen, alkyl, or aralkyl;

or k is two and Q represents a linking moiety, wherein the linking moiety is either vii) a carbonate linkage $CH_2O]_2(C=O)$ as in formula X:

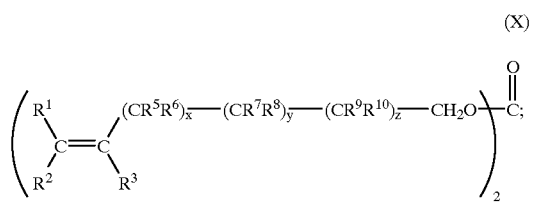

(X)

viii) a mono-ether linkage $CH_2]_2O$ as in formula XI:

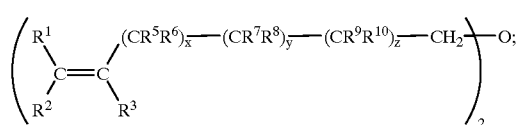

(XI)

ix) a di-ether linkage $CH_2O]_2R^{13}$ as in formula XII:

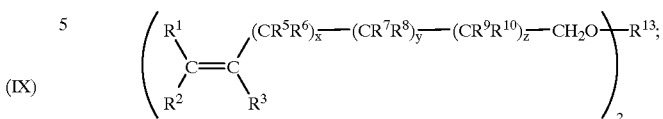

(XII)

x) a mono-ester linkage $(C=O)OCH_2$ as in formula XIII:

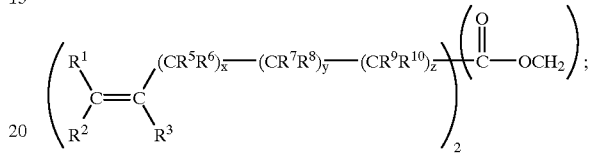

(XIII)

xi) a di-ester linkage $(C=O)O]_2R^{14}$ as in formula XIV:

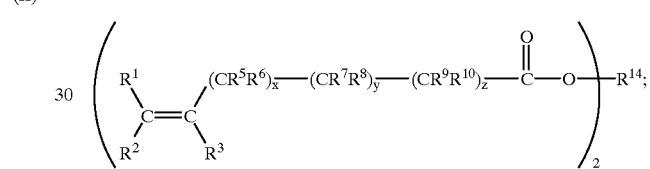

(XIV)

or xii) a di-ester linkage $CH_2O(C=O)]_2R^{15}$ as in formula XV:

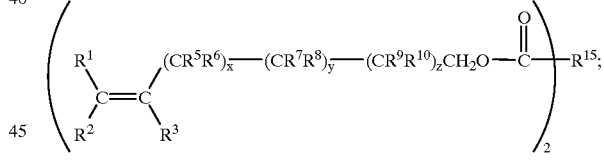

(XV)

wherein $R^{13}$, $R^{14}$, and $R^{15}$ are alkyl, aralkyl, alkaryl, or aryl; and B) a phenolic reactant of formula XVI containing at least one unsubstituted ortho or para position

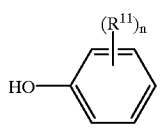

(XVI)

wherein $R^{11}$ independently at each occurrence represents alkyl or halogen; and n is 0–3.

29. The method of claim 28 in which the acidic material is an acidic polymeric resin.

30. The method of claim 29 in which the acidic polymeric resin comprises a sulfonic acid-functionalized resin.

31. The method of claim 28 in which $R^1$ and $R^2$ are methyl; $R^3$, $R^5$, $R^6$, $R^7$, $R^8$, $R^9$, and $R^{10}$ independently at each occurrence represent hydrogen or $C_{1-4}$ alkyl.

32. The method of claim 28 in which $R^1$ and $R^2$ are methyl; $R^3$, $R^5$, $R^6$, $R^7$, $R^8$, $R^9$, and $R^{10}$ independently at each occurrence represent hydrogen or $C_{1-2}$ alkyl.

33. The method of claim 32 in which x, y, and z independently at each occurrence are 0–2, wherein the sum of each x+y+z grouping is at least 2.

34. The method of claim 33 in which k is one, and Q is $CH_2OH$, $CO_2H$, $COCl$, $CO_2R^{12}$, or $CO_2M$, wherein $R^{12}$ is alkaryl or aryl; and wherein M is a quaternary ammonium cation, a guanidinium cation, or a quaternary phosphonium cation; or an alkali or alkaline earth metal cation.

35. The method of claim 34 in which Q is $CO_2H$.

36. The method of claim 34 in which Q is $CH_2OH$.

37. The method of claim 34 in which Q is $CO_2C_6H_5$.

38. The method of claim 33 in which Q represents $R^{16}C=CR^{17}R^{18}$, wherein $R^{16}$, $R^{17}$, and $R^{18}$ are each independently hydrogen or $C_{1-2}$ alkyl.

39. The method of claim 33 in which k is one, and Q is

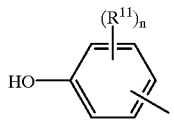

(II)

wherein $R^{11}$ independently at each occurrence represents $C_{1-22}$ alkyl; n is 0–3; and the free valence bond in formula II is predominantly either ortho or para to the phenolic group.

40. The method of claim 28 in which k is one, $R^1$ and $R^2$ are methyl; $R^3$ is hydrogen; $R^5$ and $R^6$ are hydrogen and x is two; $R^7$ is hydrogen, $R^8$ is methyl, and y is one; $R^9$ and $R^{10}$ are hydrogen and z is one; and Q is either $CH_2Br$, $CH_2Cl$, $CO_2H$, $COCl$, $CH_2OH$, $CHO$, $CO_2R^{12}$, or $CO_2M$, wherein $R^{12}$ is aryl or alkaryl; and wherein M is a quaternary ammonium cation, a guanidinium cation, or sodium, as in formula XXII:

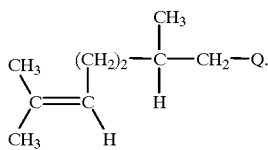

(XXII)

41. The method of claim 40 in which Q is $CO_2H$.

42. The method of claim 40 in which Q is $CH_2OH$.

43. The method of claim 40 in which Q is $CO_2C_6H_5$.

44. The method of claim 28 in which k is one, $R^1$ and $R^2$ are methyl; $R^3$ is hydrogen; $R^5$ and $R^6$ are hydrogen and x is two; $R^7$ is hydrogen, $R^8$ is methyl, and y is one; z is zero; and Q is $R^{16}C=CR^{17}R^{18}$, wherein $R^{16}$, $R^{17}$, $R^{18}$ are hydrogen.

45. The method of claim 28 in which k is one, $R^1$ and $R^2$ are methyl; $R^3$ is hydrogen; $R^5$ and $R^6$ are hydrogen and x is two; y and z are zero; and Q is $R^{16}C=CR^{17}R^{18}$, wherein $R^{16}$ is methyl, $R^{17}$ is hydrogen, and $R^{18}$ is methyl.

46. The method of claim 28 in which k is one, $R^1$ and $R^2$ are methyl; $R^3$ is hydrogen; $R^5$ and $R^6$ are hydrogen and x is one; y and z are zero; and Q is $R^{16}C=CR^{17}R^{18}$, wherein $R^{16}$ is hydrogen, $R^{17}$ is methyl, and $R^{18}$ is ethyl.

47. The method of claim 28 in which k is two, and in each grouping $R^1$ and $R^2$ are methyl; $R^3$ is hydrogen; $R^5$ and $R^6$ are hydrogen and x is two; $R^7$ is hydrogen, $R^8$ is methyl, and y is one; $R^9$ and $R^{10}$ are hydrogen and z is one; and Q is a linking group, as in formula XXIII:

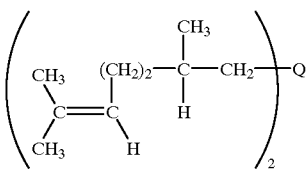

(XXIII)

wherein the linking moiety is either a carbonate linkage $CH_2O]_2(C=O)$; a mono-ether linkage $CH_2]_2O$; a di-ether linkage $CH_2O]_2R^{13}$; a mono-ester linkage $(C=O)OCH_2$; a di-ester linkage $(C=O)O]_2R^{14}$; or a di-ester linkage $CH_2O(C=O)]_2R^{15}$, wherein $R^{13}$, $R^{14}$, and $R^{15}$ are alkyl, aralkyl, alkaryl, or aryl.

48. The method of claim 47 in which the linking moiety is a carbonate linkage $CH_2O]_2(C=O)$.

49. The method of claim 47 in which the linking moiety is a di-ether linkage $CH_2O]_2R^{13}$ and $R^{13}$ is an aryl residue derived from hydroquinone, resorcinol, or methylresorcinol.

50. The method of claim 47 in which the linking moiety is a mono-ester linkage $(C=O)OCH_2$.

51. The method of claim 47 in which the linking moiety is a di-ester linkage $(C=O)O]_2R^{14}$ and $R^{14}$ is an aryl residue derived from hydroquinone, resorcinol, or methylresorcinol.

52. The method of claim 47 in which the linking moiety is a di-ester linkage $CH_2O(C=O)]_2R^{15}$ and $R^{15}$ is an aryl residue derived from terephthalic acid, isophthalic acid, or 2,6-naphthalenedicarboxylic acid.

53. The method of claim 28 in which the phenolic reactant is phenol or ortho-cresol.

54. The method of claim 34 in which the phenolic reactant is phenol or ortho-cresol.

55. The method of claim 40 in which the phenolic reactant is phenol or ortho-cresol.

56. The method of claim 41 in which the phenolic reactant is phenol or ortho-cresol.

57. The method of claim 42 in which the phenolic reactant is phenol or ortho-cresol.

58. The method of claim 44 in which the phenolic reactant is phenol or ortho-cresol.

59. The method of claim 45 in which the phenolic reactant is phenol or ortho-cresol.

60. The method of claim 46 in which the phenolic reactant is phenol or ortho-cresol.

61. The method of claim 47 in which the phenolic reactant is phenol or ortho-cresol.

62. The method of claim 48 in which the phenolic reactant is phenol or ortho-cresol.

63. The method of claim 50 in which the phenolic reactant is phenol or ortho-cresol.

64. The method of claim 51 in which the phenolic reactant is phenol or ortho-cresol.

65. The method of claim 52 in which the phenolic reactant is phenol or ortho-cresol.

66. The method of claim 28 in which the phenolic reactant is hydrocardanol.

67. The method of claim 40 in which the phenolic reactant is hydrocardanol.

68. The method of claim 41 in which the phenolic reactant is hydrocardanol.

69. The method of claim 42 in which the phenolic reactant is hydrocardanol.

70. A method for making phenolic compounds which comprises combining in the presence of an acidic polymeric resin:

A) a precursor compound of the formula XXII in which Q is $CO_2H$ or $CH_2OH$:

(XXII)

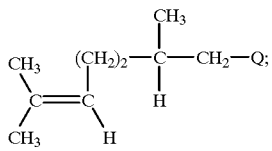

B) phenol or hydrocardanol.

71. The method of claim 70 in which the phenolic reactant is phenol.

72. A method for making phenolic compounds which comprises combining in the presence of an acidic polymeric resin:

A) a precursor compound of the formula XXV:

(XXV)

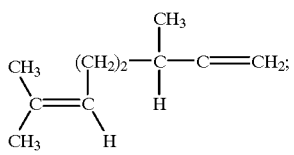

B) phenol or ortho-cresol.

73. A method for making phenolic compounds which comprises combining in the presence of an acidic polymeric resin:

A) a precursor compound of the formula XXIV in which Q is a mono-ester linkage (C=O)OCH$_2$:

(XXIV)

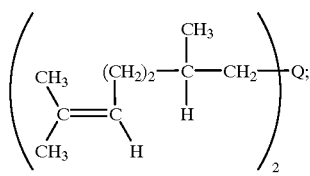

B) phenol or ortho-cresol.

74. A method for making phenolic compounds which comprises combining in the presence of an acidic polymeric resin:

A) a precursor compound of the formula XXIV in which Q is a di-ester linkage CH$_2$O(C=O)]$_2$R$^{15}$, wherein R$^{15}$ is an aryl residue derived from terephthalic acid or isophthalic acid:

(XXIV)

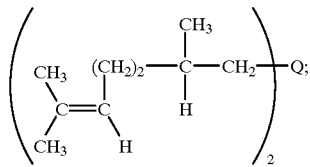

B) phenol or ortho-cresol.

75. A polycarbonate made through combining at least one dihydric phenol and a carbonate precursor under reactive conditions with at least one phenolic compound of formula I:

(I)

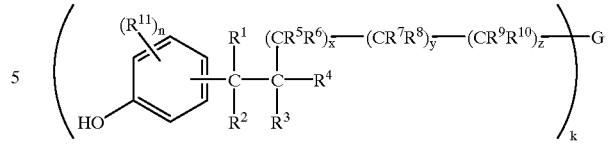

wherein R$^1$ and R$^2$ independently at each occurrence represent alkyl or aralkyl; the free valence bond linking the aryl ring to the alpha-carbon atom independently at each occurrence is either ortho or para to the phenolic group, or a mixture of ortho and para isomers; R$^3$, R$^4$, R$^5$, R$^6$, R$^7$, R$^8$, R$^9$, and R$^{10}$ independently at each occurrence represent hydrogen, alkyl or aralkyl; R$^{11}$ independently at each occurrence represents alkyl or halogen; n independently at each occurrence is 0–3; x, y, and z independently at each occurrence are 0–4, wherein the sum of each x+y+z grouping is at least 1; and either k is one and G represents CH$_2$OH, or (II)

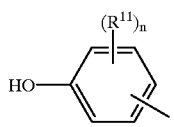

wherein R$^{11}$ independently at each occurrence represents alkyl or halogen; n independently at each occurrence is 0–3; and the free valence bond in formula II is either ortho or para to the phenolic group, or a mixture of ortho and para isomers;

or k is two and G represents a linking moiety, wherein the linking moiety is either a carbonate linkage as in formula III:

(III)

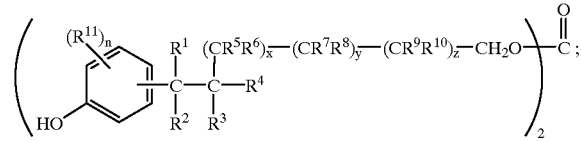

a mono-ether linkage CH$_2$]$_2$O as in formula IV:

(IV)

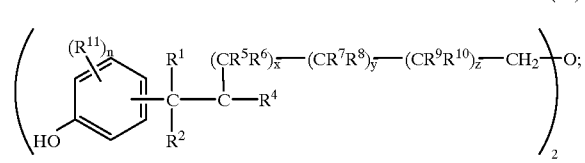

a di-ether linkage CH$_2$O]$_2$R$^{13}$ as in formula V:

(V)

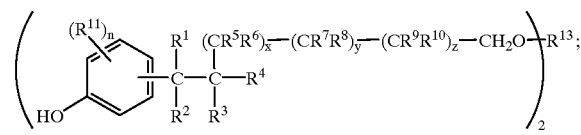

a mono-ester linkage (C=O)OCH$_2$ as in formula VI:

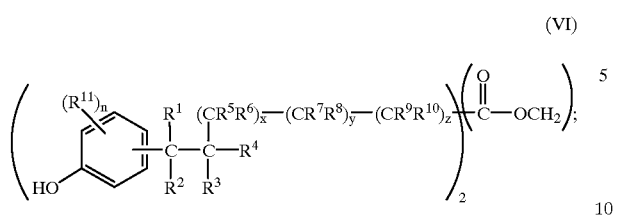
(VI)

a di-ester linkage (C=O)O]$_2$R$^{14}$ as in formula VII:

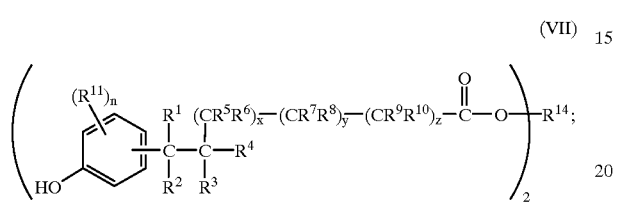
(VII)

or a di-ester linkage CH$_2$O(C=O)]$_2$R$^{15}$ as in formula VIII:

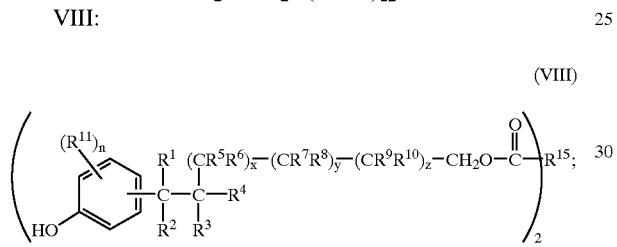
(VIII)

wherein R$^{13}$, R$^{14}$, and R$^{15}$ are alkyl, aralkyl, alkaryl, or aryl.

76. The polycarbonate of claim 75 made by an interfacial method.

77. The polycarbonate of claim 75 made by a melt method.

78. The polycarbonate of claim 75 in which the dihydric phenol is bisphenol-A, the carbonate precursor is phosgene, and the phenolic compound is 2,6-bis[methylhydroxyphenyl]-2,6-dimethyloctane.

79. The polycarbonate of claim 75 in which the dihydric phenol is a mixture of bisphenol-A and 1,1-bis(4-hydroxy-3-methylphenyl)cyclohexane, the carbonate precursor is diphenylcarbonate, and the phenolic compound is the mono-ester bisphenolic compound of formula XXII.

80. A polycarbonate made through combining bisphenol-A and phosgene under reactive conditions with at least one phenolic compound of XIX, in which the free valence bond linking each aryl ring to each alpha-carbon atom is predominantly para to the phenolic group:

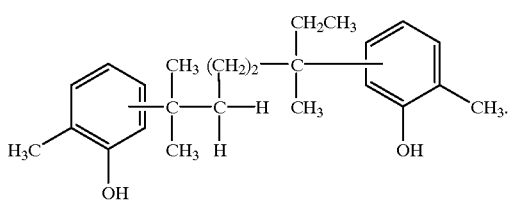
(XIX)

81. A polyestercarbonate made through combining at least one dihydric phenol and a carbonate precursor under reactive conditions with at least one phenolic compound of formula XVII,

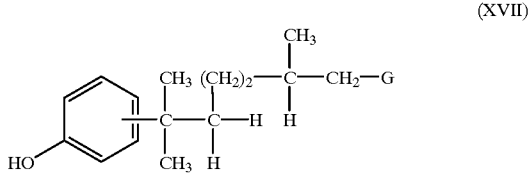
(XVII)

wherein G is either CO$_2$H, COCl, CO$_2$R$^{12}$, or CO$_2$M, wherein R$^{12}$ is alkyl, aralkyl, alkaryl, aryl, or phenyl; M is a quaternary ammonium cation, a guanidinium cation, or sodium; and the free valence bond linking the aryl ring to the alpha-carbon atom is predominantly para to the phenolic group.

82. The polyestercarbonate of claim 81 made by an interfacial method.

83. The polyestercarbonate of claim 81 made by a melt method.

84. The polyestercarbonate of claim 81 in which the dihydric phenol is bisphenol-A, the carbonate precursor is phosgene, and the phenolic compound is 7-hydroxyphenyl-citronellic acid.

85. The polyestercarbonate of claim 81 in which the dihydric phenol is a mixture of bisphenol-A and 1,1-bis(4-hydroxy-3-methylphenyl)cyclohexane, the carbonate precursor is diphenylcarbonate, and the phenolic compound is 7-hydroxyphenyl-citronellic acid.

86. A polyestercarbonate made through combining bisphenol-A and phosgene under reactive conditions with 7-hydroxyphenyl-citronellic acid, wherein the free valence bond linking the aryl ring to the alpha-carbon atom is predominantly para to the phenolic group.

87. An article made from the polycarbonate of claim 75.
88. An article made from the polycarbonate of claim 78.
89. An article made from the polycarbonate of claim 79.
90. An article made from the polyestercarbonate of claim 81.
91. An article made from the polyestercarbonate of claim 84.
92. An article made from the polyestercarbonate of claim 85.

* * * * *